US009491317B2

(12) United States Patent
Sawada

(10) Patent No.: US 9,491,317 B2
(45) Date of Patent: Nov. 8, 2016

(54) PRINTER THAT SUPPLIES CAPABILITY INFORMATION TO AN EXTERNAL APPARATUS AND TO ACQUIRE PRINT DATA FROM THE EXTERNAL APPARATUS, STORAGE MEDIUM AND METHOD FOR PRINTER

(71) Applicant: BROTHER KOGYO KABUSHIKI KAISHA, Nagoya-shi, Aichi-ken (JP)

(72) Inventor: Kazuhide Sawada, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/867,853

(22) Filed: Sep. 28, 2015

(65) Prior Publication Data

US 2016/0094727 A1 Mar. 31, 2016

(30) Foreign Application Priority Data

Sep. 30, 2014 (JP) ................................. 2014-199637

(51) Int. Cl.
  *G06F 3/12* (2006.01)
  *H04N 1/00* (2006.01)
  *H04N 1/41* (2006.01)
  *H04N 1/393* (2006.01)

(52) U.S. Cl.
  CPC ...... *H04N 1/00127* (2013.01); *H04N 1/00236* (2013.01); *H04N 1/3935* (2013.01); *H04N 1/41* (2013.01); *H04N 2201/0094* (2013.01)

(58) Field of Classification Search
  None
  See application file for complete search history.

(56) References Cited

U.S. PATENT DOCUMENTS

| 6,594,028 B1 | 7/2003 | Hamamoto et al. |
| 7,057,772 B1 * | 6/2006 | Bannai ................... H04N 19/60 358/1.9 |
| 2002/0131088 A1 * | 9/2002 | Ishii .................... H04N 1/00209 358/402 |
| 2006/0221360 A1 * | 10/2006 | Yoshida ................ G06F 3/1211 358/1.1 |
| 2007/0076247 A1 | 4/2007 | Mori |
| 2010/0188688 A1 * | 7/2010 | Selvaraj ................ G06F 3/1204 358/1.15 |
| 2010/0309513 A1 * | 12/2010 | Aizawa .................. G06F 3/1204 358/1.15 |
| 2013/0050760 A1 | 2/2013 | Sakuragi et al. |
| 2015/0109638 A1 * | 4/2015 | Sasaki ................... G06F 3/1205 358/1.15 |

FOREIGN PATENT DOCUMENTS

| JP | 2000-343794 A | 12/2000 |
| JP | 2001-195207 A | 7/2001 |
| JP | 2001-301281 A | 10/2001 |
| JP | 2007-069359 A | 3/2007 |
| JP | 2013-064977 A | 4/2013 |

\* cited by examiner

*Primary Examiner* — Miya J Cato

(74) *Attorney, Agent, or Firm* — Merchant & Gould P.C.

(57) ABSTRACT

A printer that performs: supplying first capability information which includes information indicating that the printer has a specific processing capability to a first external apparatus, acquiring first print data from the first external apparatus in response to the supplying of the first capability information, executing first printing processing including specific processing corresponding to the specific processing capability in response to the acquiring of the first print data, supplying, in a case where the first print data satisfies a first predetermined condition, second capability information, which does not include the information indicating that the printer has the specific processing capability, to a second external apparatus, acquiring second print data from the second external apparatus in response to the supplying of the second capability information, and executing second printing processing not including the specific processing in response to the acquiring of the second print data.

12 Claims, 9 Drawing Sheets

(FIRST ILLUSTRATIVE EMBODIMENT)

(SECOND AND THIRD ILLUSTRATIVE EMBODIMENTS)

FIG. 6 (FOURTH FIRST ILLUSTRATIVE EMBODIMENT)

(FIFTH ILLUSTRATIVE EMBODIMENT)

(SIXTH ILLUSTRATIVE EMBODIMENT)

PRINTER THAT SUPPLIES CAPABILITY INFORMATION TO AN EXTERNAL APPARATUS AND TO ACQUIRE PRINT DATA FROM THE EXTERNAL APPARATUS, STORAGE MEDIUM AND METHOD FOR PRINTER

CROSS-REFERENCE TO RELATED APPLICATIONS

This application claims priority from Japanese Patent Application No. 2014-199637 filed on Sep. 30, 2014, the entire contents of which are incorporated herein by reference.

TECHNICAL FIELD

The specification discloses a printer that supplies capability information to an external apparatus and to acquire print data from the external apparatus.

BACKGROUND

There has been disclosed a system having a printer and a PC. When a capability information notice request is received from the PC, the printer transmits a capability notice, which indicates that the printer has a specification, to the PC. The PC displays a print setting screen, in response to the capability notice, and receives a user's print setting. The PC generates a print job by using the print setting and transmits the print job to the printer. The printer executes a printing by using the print job.

According to this technology, since the capability notice transmitted from the printer to the PC indicates the same specification all the time, there is a possibility that the printing will not be appropriately executed.

SUMMARY

In the specification, a technology which is capable of appropriately executing a printing by using print data transmitted from an external apparatus to a printer is provided.

The specification discloses a printer including a printing execution unit, a processor, and a memory storing computer-readable instructions therein, the computer-readable instructions, when executed by the processor, causing the printer to perform: supplying first capability information, which includes information indicating that the printer has a specific processing capability, to a first external apparatus, acquiring, in response to the supplying of the first capability information to the first external apparatus, first print data from the first external apparatus, executing, in response to the acquiring of the first print data, first printing processing that causes the printing execution unit to execute a printing by using the first print data, the first printing processing including specific processing corresponding to the specific processing capability, supplying, in a case where the first print data satisfies a first predetermined condition, second capability information, which does not include the information that the printer has indicating the specific processing capability, to a second external apparatus, acquiring, in response to the supplying of the second capability information to the second external apparatus, second print data from the second external apparatus, and executing, in response to the acquiring of the second print data, second printing processing that causes the printing execution unit to execute a printing by using the second print data, the second printing processing not including the specific processing.

According to the above configuration, the printer supplies the first capability information, which includes the information indicating the specific processing capability, to the first external apparatus. After that, in a case where the first print data satisfies the first predetermined condition, the printer supplies the second capability information, which does not include the information indicating the specific processing capability, to the second external apparatus. In this way, since the content of the capability information supplied from the printer to the external apparatus is changed, it can be possible to appropriately execute a printing using the print data supplied from the external apparatus to the printer.

A control method, a computer program and a computer-readable storage medium having the computer program stored thereon for implementing the printer are also novel and useful. Also, a communication system including the printer and the external apparatus (for example, the first external apparatus, the second external apparatus and the like) are also novel and useful.

Figure 1:
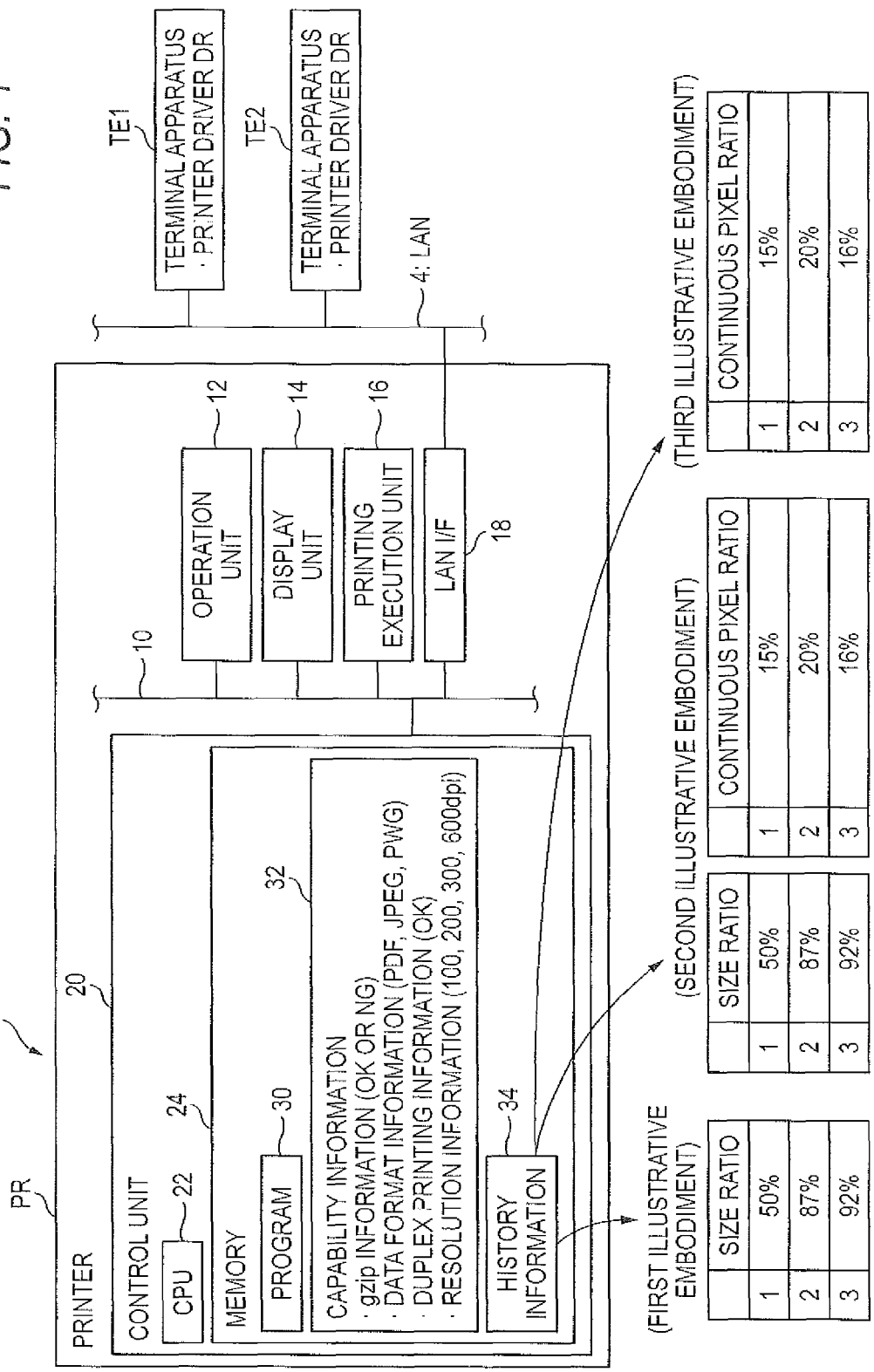
FIG. 1 shows a configuration of a communication system.

DETAILED DESCRIPTION (Configuration of Communication System 2; FIG. 1)

As shown in FIG. 1, a communication system 2 includes a printer PR and a plurality of terminal apparatuses TE1, TE2. The respective devices PR, TE1, TE2 can perform wired or wireless communication via a LAN (abbreviation of Local Area Network) 4.

(Configuration of Printer PR)

The printer PR is a peripheral device (i.e., a peripheral device of each of the terminal apparatuses TE1, TE2) capable of executing a printing function. In the meantime, the printer PR may be a multifunctional device capable of executing a scan function, a FAX function and the like, in addition to the printing function. The printer PR has an operation unit 12, a display unit 14, a printing execution unit 16, a LAN interface 18, and a control unit 20. The respective units 12 to 20 are connected to a bus line 10.

The operation unit 12 has a plurality of keys. A user can input a variety of instructions to the printer PR by operating the operation unit 12. The display unit 14 is a display for displaying a variety of information. The printing execution unit 16 is a printing mechanism of an inkjet type, a laser type and the like. The LAN interface 18 is connected to the LAN 4.

The control unit 20 has a CPU 22 and a memory 24. The CPU 22 is a processor configured to execute a variety of processing by using a program 30 stored in the memory 24. The memory 24 is configured by a ROM, a RAM and the like, and stores therein capability information 32 and history information 34, in addition to the program 30.

The capability information 32 is information indicating a processing capability of the printer PR. The capability information 32 includes gzip (abbreviation of GNU ZIP) information, data format information, duplex printing information and resolution information. The gzip information indicates whether the printer PR has a decompression capability of decompressing data compressed by using the gzip compression method. In this illustrative embodiment, since the printer PR has the decompression capability, the gzip information usually indicates 'OK' meaning that the printer PR has the decompression capability. However, although detailed descriptions will be made later, the gzip information may indicate 'NG' meaning that the printer PR does not have the decompression capability, even when the printer PR has the decompression capability. The data format information is information indicating a data format that the printer PR can rasterize (i.e., interpret). In this illustrative embodiment, the data format information includes information indicating a PDF (abbreviation of Portable Document Format), information indicating a JPEG (abbreviation of Joint Photograph Experts Group), and information indicating a PWG (abbreviation of Printer Working Group). This means that the printer PR has a rasterization capability for any of the PDF format, the JPEG format and the PWG format. The duplex printing information indicates 'OK' meaning that the printer PR has a capability of printing images on both surfaces of a printing medium. The resolution information indicates a plurality of resolutions (100 dpi and the like). This means that the printer PR has a capability of executing a printing by using each resolution of the plurality of resolutions.

The history information 34 includes index values, which indicate compression efficiencies of three latest print data acquired by the printer PR. Specifically, in this illustrative embodiment, the index value is a size ratio, which indicates a ratio of a compressed data size to a decompressed data size. That is, the size ratio is expressed by an equation '(compressed data size/decompressed data size)×100(%)'. Here, the compressed data size is a data size of data compressed by using the gzip method, and the decompressed data size is a data size of decompressed data obtained by decompressing the compressed data. The greater a value of the size ratio, the compression efficiency is lower, and the smaller a value of the size ratio, the compression efficiency is higher. Also, in second and third illustrative embodiments (which will be described later), a continuous pixel ratio, which is different from the size ratio, is used as the index value. Meanwhile, in a modified embodiment, the number of index values included in the history information 34 may not be at most three, and may be at most one, two or four or more.

(Configuration of Each of Terminal Apparatuses TE1, TE2)

Each of the terminal apparatuses TE1, TE2 is a desktop PC (abbreviation of Personal Computer), a note PC, a tablet PC, a mobile phone (for example, smart phone), a PDA and the like. Each of the terminal apparatuses TE1, TE2 has a printer driver DR for enabling the printer PR to execute a printing by using an IPP (Internet Printing Protocol). The printer driver DR is installed to each of the terminal apparatuses TE1, TE2 from a server on the Internet provided by a vendor of the printer PR or another business provider. However, in a modified embodiment, the printer driver DR may be installed in advance to each of the terminal apparatuses TE1, TE2 from a shipment stage of each of the terminal apparatuses TE1, TE2, or may be installed to each of the terminal apparatuses TE1, TE2 from a medium shipped out together with the printer PR.

Figure 2:
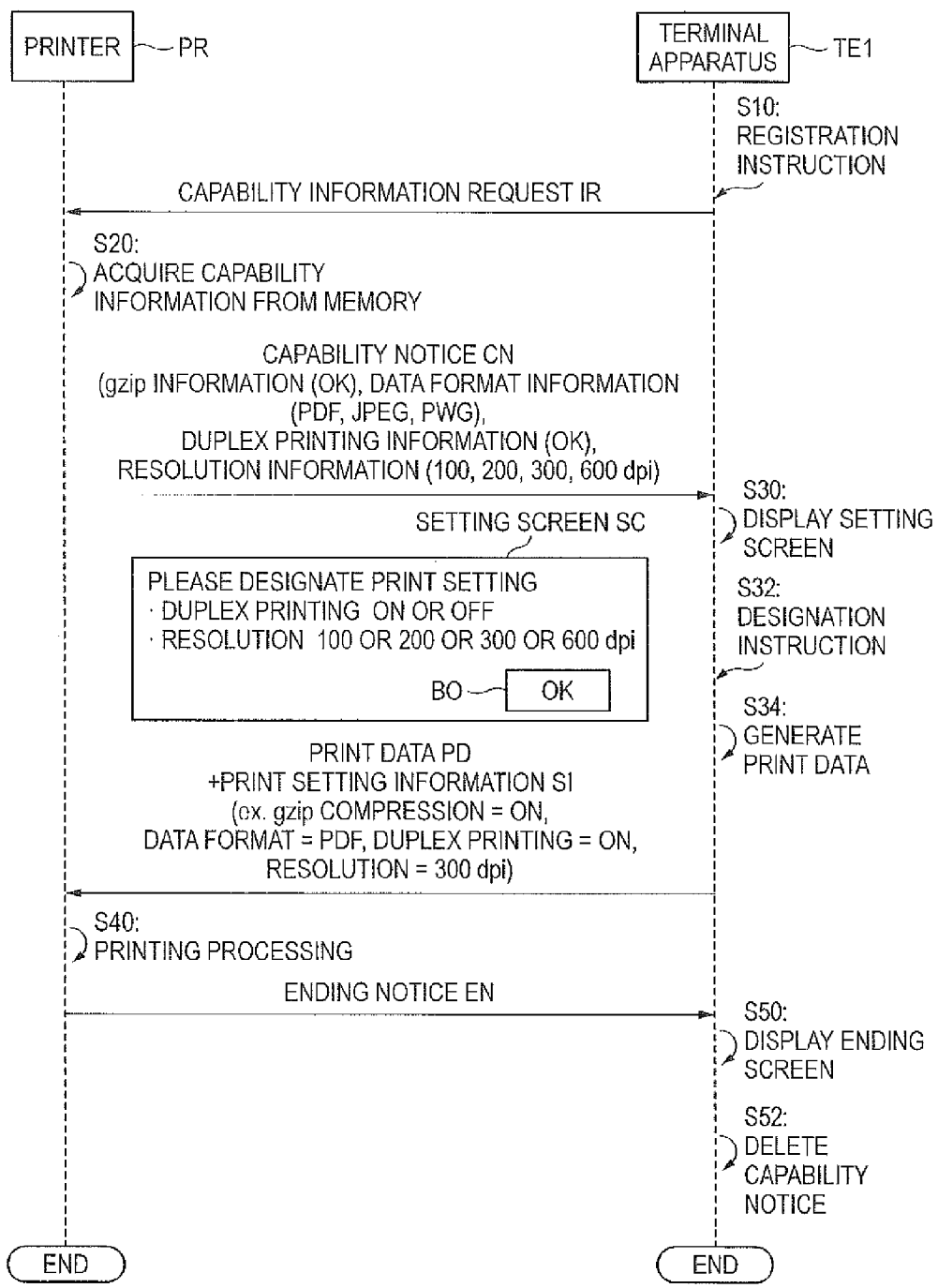
FIG. 2 shows a sequence diagram of each processing that is executed by a printer and a terminal apparatus.

(Processing of Printer PR and Terminal Apparatus TE1; FIG. 2)

Subsequently, each processing that is executed by the printer PR and the terminal apparatus TE1 is described with reference to FIG. 2. The respective processing is processing for enabling the printer PR to execute a printing by using the IPP. Here, the terminal apparatus TE2 can execute the same processing as the terminal apparatus TE1.

In S10, the terminal apparatus TE1 receives a registration instruction from a user. The registration instruction is an instruction for temporarily registering the printer PR connected to the same LAN 4 as the terminal apparatus TE1 in the terminal apparatus TE1, and includes an instruction for activating the printer driver DR and an instruction for selecting a button indicating 'registration' of the printer PR on a screen displayed by the printer driver DR. In a case where the registration instruction is received from the user (S10), the terminal apparatus TE1 supplies a capability information request IR to the printer PR.

In a case where the capability information request IR is acquired from the terminal apparatus TE1, the CPU 22 of the printer PR acquires the capability information 32 from the memory 24 in S20. Then, the CPU 22 supplies a capability notice CN including the current information (the gzip information, the data format information and the like) in the capability information 32 to the terminal apparatus TE1. In FIG. 2, an example where the gzip information in the capability notice CN indicates 'OK' is shown.

The terminal apparatus TE1 acquires the capability notice CN from the printer PR, thereby temporarily registering the printer PR. Then, in S30, the terminal apparatus TE1 displays a setting screen SC. The setting screen SC includes respective character strings corresponding to the duplex printing information and resolution information in the capability notice CN. In the example of FIG. 2, since the duplex printing information in the capability notice CN indicates 'OK', the setting screen SC includes a character string for designating any one of 'ON' indicating that the duplex printing is to be executed and 'OFF' indicating that the duplex printing is not to be executed. On the other hand, in a case where the duplex printing information in the capability notice CN indicates 'NG', the setting screen SC does not include the character string indicating the duplex printing 'ON'. That is, the user cannot designate the duplex printing 'ON'. Also, since the resolution information in the capability notice CN indicates four resolutions (100 dpi and the like), the setting screen SC includes a character string for designating any one of the four resolutions. The setting screen SC does not include the respective character strings corresponding to the gzip information and data format information in the capability notice CN. That is, the user cannot designate whether or not to execute the compression by using the gzip compression method (hereinafter, referred to as 'gzip compression'), and cannot designate a data format of print data that should be provided to the printer PR.

In S32, the terminal apparatus TE1 receives a designation instruction from the user. The designation instruction includes an instruction for designating whether or not to execute the duplex printing, an instruction for designating any one resolution (hereinafter, referred to as 'designated resolution') of the four resolutions, and an instruction for selecting an OK button BO on the setting screen SC. The designation instruction further includes an instruction for designating one image data (hereinafter, referred to as 'designated image data') from one or more image data preserved in the terminal apparatus TE1. The designated image data includes RGB bitmap data of multiple tones (for example, 256 tones). Hereinafter, the bitmap data is referred to as 'BMP data'.

In a case where the designation instruction is received from the user (S32), the terminal apparatus TE1 generates print data PD from the designated image data, in S34. Specifically, the terminal apparatus TE1 first determines whether the data format of the designated image data is included in each data format (hereinafter, referred to as 'capability data format') represented by the data format information in the capability notice CN. In a case where it is determined that the data format of the designated image data is not included in the respective capability data formats, the terminal apparatus TE1 executes format conversion processing for the designated image data to generate format-converted image data having any one of the respective capability data formats. Then, the terminal apparatus TE1 executes resolution conversion processing for the format-converted image data to generate resolution-converted image data having the designated resolution. Meanwhile, in a case where it is determined that the data format of the designated image data is included in the respective capability data formats, the terminal apparatus TE1 executes the resolution conversion processing for the designated image data to generate resolution-converted image data having the designated resolution. Then, in a case where the gzip information in the capability notice CN indicates 'NG', the terminal apparatus TE1 determines the resolution-converted image data as the print data PD without executing the gzip compression for the resolution-converted image data. On the other hand, in a case where the gzip information in the capability notice CN indicates 'OK', the terminal apparatus TE1 executes the gzip compression for the resolution-converted image data and determines the compressed image data as the print data PD.

Then, the terminal apparatus TE1 supplies the print data PD and print setting information SI to the printer PR. The print setting information SI includes a character string (i.e., the 'gzip compression=ON') indicating that the gzip compression has been executed, in a case where the gzip compression is executed and the print data PD is thus generated, and a character string (i.e. the 'gzip compression=OFF') indicating that the gzip compression has not been executed, in a case where the print data PD is generated without executing the gzip compression. The print setting information SI further includes a character string (for example the 'data format=PDF') indicating the data format of the print data PD. Also, the print setting information SI includes a character string (i.e., 'duplex printing=ON') indicating that the duplex printing is to be executed, in a case where the duplex printing 'ON' is designated on the setting screen SC by the user, and includes a character string (i.e., 'duplex printing=OFF') indicating that the duplex printing is not to be executed, in a case where the duplex printing 'OFF' is designated on the setting screen SC by the user. The print setting information SI further includes a character string (for example, the 'resolution=300 dpi') indicating the designated resolution.

In a case where the print data PD and the print setting information SI are acquired from the terminal apparatus TE1, the CPU 22 of the printer PR executes printing processing in S40. Thereby, it is possible to provide the user with a printing medium printed by using the print data PD. In a case where the printing processing is over, the CPU 22 supplies an ending notice EN including a message, which indicates the printing ending, to the terminal apparatus TE1.

In a case where the ending notice EN is acquired from the printer PR, the terminal apparatus TE1 displays an ending screen including a message, which indicates that the printing processing is over, in S50. Then, the terminal apparatus TE1 deletes the acquired capability notice CN. Thereby, the registered state of the printer PR in the terminal apparatus TE1 is released. Therefore, in order for the terminal apparatus TE1 to cause the printer PR to execute the printing again, the respective processing (i.e., all processing of S10 to S52) including the processing of S10 to S32 is executed again.

Figure 3:
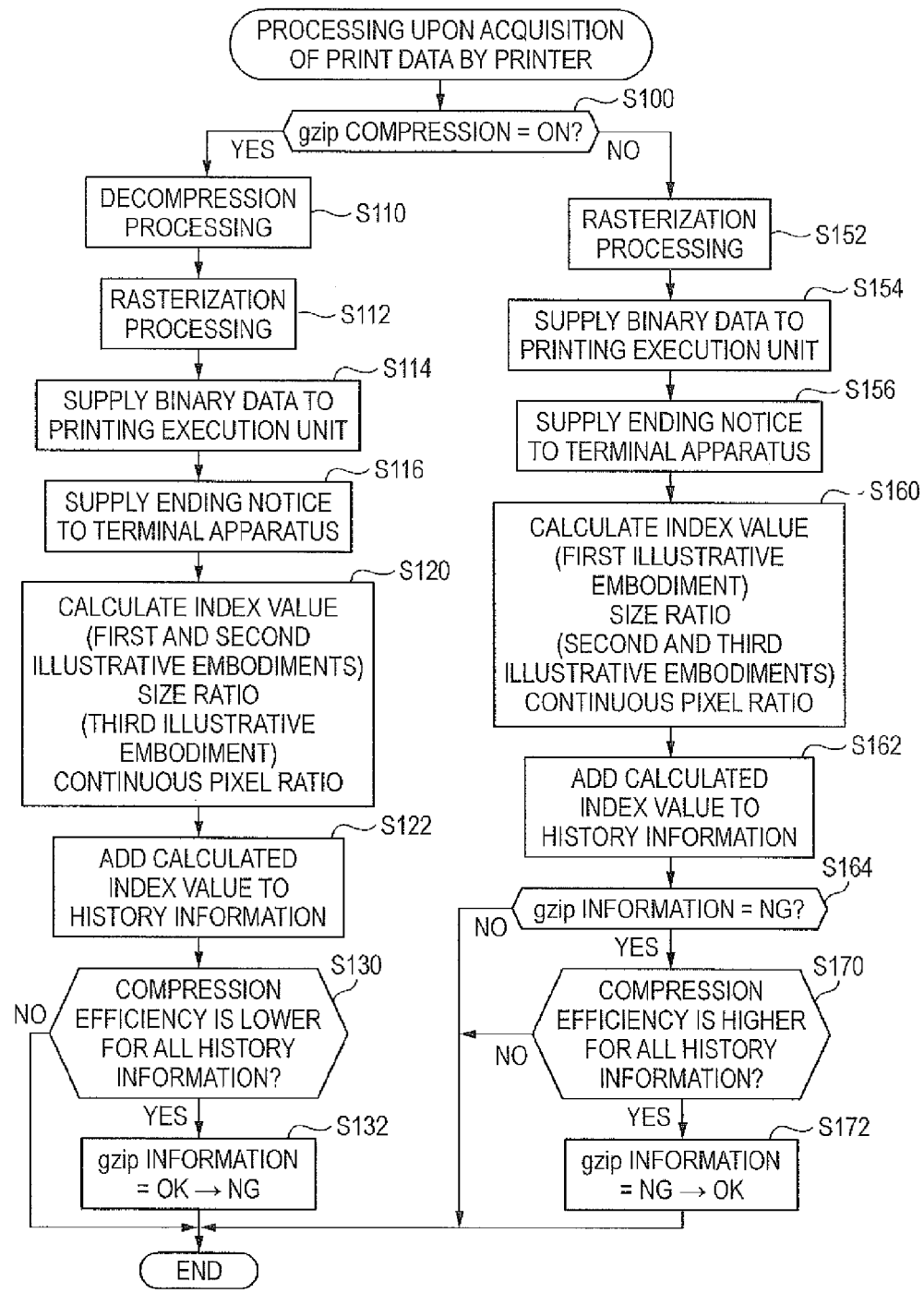
FIG. 3 is a flowchart showing processing upon acquisition of print data in first to third illustrative embodiments.

(Processing Upon acquisition of Print Data; FIG. 3)

Subsequently, processing upon acquisition of print data that is to be executed by the printer PR is described with reference to FIG. 3. In a case where the print data and the print setting information are acquired (see PD and SI in FIG. 2) from the terminal apparatus (for example, TE1), the CPU 22 of the printer PR starts processing of FIG. 3. Hereinafter, a terminal apparatus that has supplied the print data is referred to as 'target terminal apparatus'. Here, the processing of FIG. 3 includes the printing processing of S40 in FIG. 2 and the supply of the ending notice EN.

In S100, the CPU 22 determines whether the character string indicating the 'gzip compression=ON' is included in the print setting information acquired from the target terminal apparatus. In a case where the character string indicating the 'gzip compression=ON' is included in the print setting information, i.e., in a case where the compressed print data generated by the gzip compression is acquired from the target terminal apparatus, the CPU 22 determines YES in S100 and executes printing processing of S110 to S114. On the other hand, in a case where the character string indicating the 'gzip compression=OFF' is included in the print setting information, i.e., in a case where the non-compressed print data generated without executing the gzip compression is acquired from the target terminal apparatus, the CPU 22 determines NO in S100, and executes printing processing of S152 and S154. Here, the printing processing of S110 to S114 and the printing processing of S152 and S154 indicate the specific processing of the printing processing of S40 in FIG. 2.

In S110, the CPU 22 executes decompression processing of decompressing the compressed print data to generate decompressed print data. The decompressed print data includes the RGB BMP data of multiple tones (for example, 256 tones), and a variety of commands corresponding to the data formats (for example, PDF, JPEG and the like) of the decompressed print data. The various commands include a command for instructing a font type, a command for instructing a decoration (for example, gradation) and the like.

In S112, the CPU 22 executes rasterization processing of rasterizing the decompressed print data generated in S110 to generate binary data. Specifically, the CPU 22 first processes the BMP data included in the decompressed print data by using the variety of commands included in the decompressed print data, thereby generating processed BMP data. For example, the CPU 22 generates the processed BMP data, which indicates a text having a font type, by using the command that instructs the font type. Then, the CPU 22 executes color conversion processing for the processed BMP data, thereby generating CMYK BMP data of multiple tones (for example, 256 tones). Then, the CPU 22 executes binarization processing for the CMYK BMP data of multiple tones, thereby generating the binary data, which is CMYK BMP data of two tones (i.e., dot ON or dot OFF). Meanwhile, in a modified embodiment, the CPU 22 may generate BMP data of three tones (for example, large dot ON, small dot ON and dot OFF) or BMP data of four tones or more, instead of the binary data.

In S114, the CPU 22 supplies the binary data generated in S112 to the printing execution unit 16. Thereby, the printing execution unit 16 prints an image represented by the binary data on a printing medium. As a result, it is possible to provide the user with the printed printing medium.

When the printing processing of S110 to S114 is over, the CPU 22 supplies an ending notice to the target terminal apparatus in S116.

Then, in S120, the CPU 22 calculates the index value, which indicates the compression efficiency of the compressed print data. Specifically, the CPU 22 calculates the size ratio by using the equation '(compressed data size/decompressed data size)×100(%)'. Here, the compressed data size is a data size of the compressed print data acquired in S100, and the decompressed data size is a data size of the decompressed print data generated in S110.

For example, when the print data is data representing a photograph, the number of continuous pixels included in a plurality of pixels configuring the BMP data included in the print data is usually small, so that the size ratio is relatively large (i.e., the compression efficiency is low). Here, the continuous pixel is a pixel having a pixel value coinciding with a pixel value of an adjacent pixel. Also, for example, when the print data is data representing a text, the number of continuous pixels included in a plurality of pixels configuring the BMP data included in the print data is usually large, so that the size ratio is relatively small (i.e., the compression efficiency is high). The reason why the number of continuous pixels increases is because the respective pixels representing a background of the text have the same pixel value.

In S122, the CPU 22 deletes the oldest size ratio of the three size ratios included in the history information 34 (see FIG. 1) in the memory 24, and adds the size ratio calculated in S120 to the history information 34. Thereby, the three latest size ratios are included in the history information 34.

In S130, the CPU 22 determines whether the compression efficiency is lower than a preset reference efficiency for all the three size ratios included in the history information 34. Specifically, in a case where the values of the three size ratios are all greater than a reference value '80%', which indicates the reference efficiency, the CPU 22 determines that the compression efficiency is lower than the reference efficiency (YES in S130), and proceeds to S132. On the other hand, in a case where at least one of the three size ratios is equal to or smaller than the reference value '80%', the CPU 22 determines that the compression efficiency is not lower than the reference efficiency (NO in S130), skips over S132 and ends the processing of FIG. 3.

In S132, the CPU 22 changes the gzip information included in the capability information 32 in the memory 24 from 'OK' to 'NG'. Thereby, thereafter, in a case where the capability information request is acquired from the target terminal apparatus or another terminal apparatus, the CPU 22 can supply the capability notice including the gzip information, which indicates 'NG', to the terminal apparatus, so that it is possible to acquire non-compressed print data from the terminal apparatus.

In a case where the non-compressed print data is acquired, printing processing of S152 and S154 is executed. The processing of S152 is the same as the processing of S112, except that the non-compressed print data acquired in S100 is used instead of the decompressed print data. Also, the processing of S154 and S156 is the same as the processing of S114 and S116.

In S160, the CPU 22 calculates an index value, which indicates the compression efficiency in a case where the gzip compression is executed for the non-compressed print data acquired in S100. Specifically, the CPU 22 first executes the gzip compression for the non-compressed print data, thereby generating the compressed print data. Then, the CPU 22 calculates a size ratio by using the equation '(compressed data size/decompressed data size)×100(%)'. Here, the compressed data size is a data size of the compressed print data generated in S160, and the decompressed data size is a data size of the non-compressed print data acquired in S100. The processing of S162 is the same as the processing of S122. Therefore, the three size ratios included in the history information 34 can include both the size ratio calculated in S120 and the size ratio calculated in S160.

In S164, the CPU 22 determines whether the gzip information included in the capability information 32 in the memory 24 indicates 'NG' or 'OK'. In a case where it is determined that the gzip information indicates 'NG' (YES in S164), the CPU 22 proceeds to S170 and S172, and in a case where it is determined that the gzip information indicates 'OK' (NO in S164), the CPU 22 skips over S170 and S172 and ends the processing of FIG. 3.

In S170, the CPU 22 determines whether the compression efficiency is higher than the reference efficiency, for all the three size ratios included in the history information 34. Specifically, in a case where the three size ratios are all smaller than the reference value '80%', the CPU 22 determines that the compression efficiency is higher than the reference efficiency (YES in S170) and proceeds to S172. On the other hand, in a case where at least one of the three size ratios is equal to or greater than the reference value '80%', the CPU 22 determines that the compression efficiency is not higher than the reference efficiency (NO in S170), skips over S172 and ends the processing of FIG. 3. Meanwhile, in this illustrative embodiment, the reference value '80%' that is used in S170 is the same as the reference value that is used in S130. However, in a modified embodiment, the reference values may be different.

In S172, the CPU 22 changes the gzip information included in the capability information 32 in the memory 24 from 'NG' to 'OK'. Thereby, thereafter, in a case where the capability information request is acquired from the target terminal apparatus or another terminal apparatus, the CPU 22 can supply the capability notice including the gzip information, which indicates 'OK', to the terminal apparatus, so that it is possible to acquire the compressed print data from the terminal apparatus.

Figure 4:
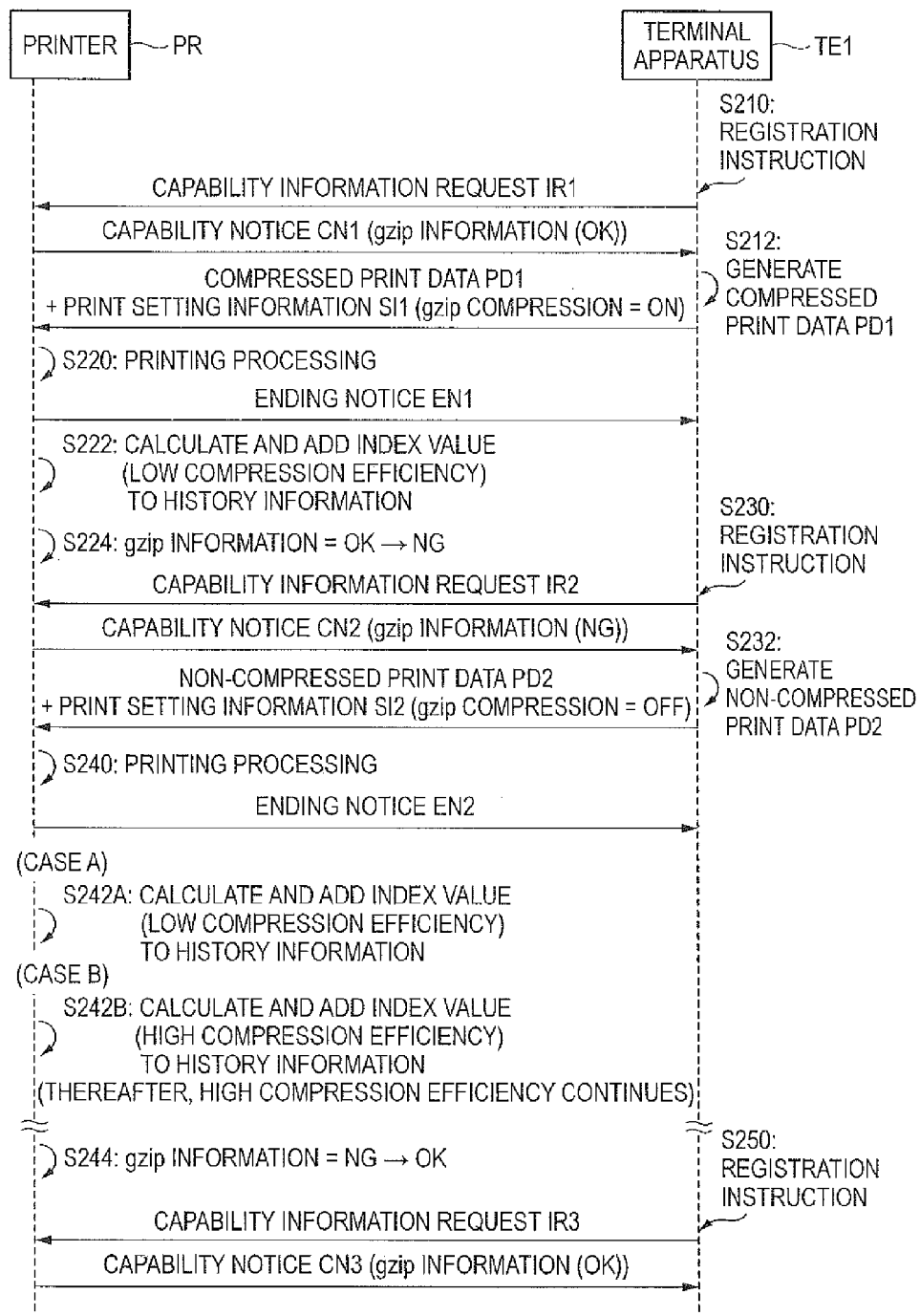
FIG. 4 is a sequence diagram of the first illustrative embodiment.

(Specific Case; FIG. 4)

Subsequently, a specific case of this illustrative embodiment is described with reference to FIG. 4. The respective processing of FIG. 4 is implemented by using the respective processing described with reference to FIG. 2 and the respective processing of the flowchart of FIG. 3. In FIG. 4, some of the described processing is not shown. For example, also in FIG. 4, the setting screen is displayed on the terminal apparatus TE1 (S30 in FIG. 2), and the designation instruction (S32) is provided from the user. However, the corresponding processing is not shown. At an initial state of FIG. 4, the gzip information included in the capability information 32 of the printer PR indicates 'OK'. Also, as shown in FIG. 1, in the history information 34, the oldest size ratio '50%' indicates the compression efficiency higher than the reference efficiency (i.e. indicates a value smaller than '80%'), and the two other size ratios '87%', '92%' indicate the compression efficiency lower than the reference efficiency (i.e. indicates a value greater than '80%').

In a case where the registration instruction is received from the user in S210, the terminal apparatus TE1 supplies a capability information request IR1 to the printer PR. In a case where the capability information request IR1 is acquired from the terminal apparatus TE1, the printer PR supplies a capability notice CN1 including the gzip information, which indicates 'OK', to the terminal apparatus TE1 because the gzip information included in the capability information 32 indicates 'OK'.

In a case where the capability notice CN1 is acquired from the printer PR, the terminal apparatus TE1 generates compressed print data PD1 from the designated image data in S212. Then, the terminal apparatus TE1 supplies the compressed print data PD1 and print setting information SI1, which includes the character string including the 'gzip compression=ON', to the printer PR. In a case where the compressed print data PD1 and the print setting information SI1 are acquired from the terminal apparatus TE1 (a trigger of the processing of FIG. 3), the printer PR executes the printing processing including the decompression processing in S220 (YES in S100, S110 to S114). Then, the printer PR supplies an ending notice EN1 to the terminal apparatus TE1 (S116).

Then, in S222, the printer PR calculates a size ratio having the compression efficiency lower than the reference efficiency (i.e. size ratio greater than 80%) (S120), deletes the oldest size ratio '50%' included in the history information 34, and adds the calculated size ratio to the history information 34 (S122). As a result, the compression efficiency becomes lower than the reference efficiency for all the three size ratios included in the history information 34 (YES in S130). Therefore, in S224, the printer PR changes the gzip information included in the capability information 32 from 'OK' to 'NG' (S132).

After that, in a case where the registration instruction is received from the user in S230, the terminal apparatus TE1 supplies a capability information request IR2 to the printer PR. In a case where the capability information request IR2 is acquired from the terminal apparatus TE1, the printer PR supplies a capability notice CN2 including the gzip information, which indicates 'NG', to the terminal apparatus TE1 because the gzip information has been changed to 'NG' in S224.

In a case where the capability notice CN2 is acquired from the printer PR, the terminal apparatus TE1 generates non-compressed print data PD2 from the designated image data in S232. The terminal apparatus TE1 supplies the non-compressed print data PD2, and print setting information SI2 including the character string, which indicates the 'gzip compression=OFF', to the printer PR. In a case where the non-compressed print data PD2 and the print setting information SI2 are acquired from the terminal apparatus TE1 (NO in S100, a trigger of the processing of FIG. 3), the printer PR executes the printing processing, which does not include the decompression processing, in S240 (S152 and S154). Then, the printer PR supplies an ending notice EN2 to the terminal apparatus TE1 (S156).

A case A is a case where the size ratio having the compression efficiency lower than the reference efficiency (i.e. size ratio greater than 80%) is calculated on the basis of the non-compressed print data PD2. In S242A, the printer PR executes the gzip compression for the non-compressed print data PD2, calculates the size ratio having the compression efficiency lower than the reference efficiency (S160), and adds the size ratio to the history information 34 (S162). Thereby, a state where the compression efficiency is lower than the reference efficiency is maintained for all the three size ratios included in the history information 34, and the gzip information included in the capability information 32 is kept as 'NG' (YES in S164, NO in S170).

On the other hand, a case B is a case where the size ratio having the compression efficiency higher than the reference efficiency (i.e. size ratio smaller than 80%) is calculated on the basis of the non-compressed print data PD2. In S242B, the printer PR executes the gzip compression for the non-compressed print data PD2, calculates the size ratio having the compression efficiency higher than the reference efficiency (S160), and adds the size ratio to the history information 34 (S162). Thereby, the compression efficiency becomes higher than the reference efficiency for the one latest size ratio of the three size ratios included in the history information 34. At this time, since the compression efficiency is lower than the reference efficiency for the two other size ratios included in the history information 34, the gzip information included in the capability information 32 is kept as 'NG' (YES in S164, NO in S170).

In the case B, thereafter, although not shown, a plurality of non-compressed print data is sequentially supplied from the terminal apparatus TE1 to the printer PR, the gzip compression is sequentially executed for each of the plurality of non-compressed print data, and the size ratio having the compression efficiency higher than the reference efficiency (i.e. size ratio smaller than 80%) is calculated for all the non-compressed print data. As a result, the compression efficiency becomes higher than the reference efficiency for all the three size ratios included in the history information 34. Therefore, in S244, the printer PR changes the gzip information included in the capability information 32 from 'NG' to 'OK' (YES in S164, YES in S170, S172).

Thereafter, in a case where the registration instruction is received from the user in S250, the terminal apparatus TE1 supplies a capability information request IR3 to the printer PR. Since the gzip information has been changed to 'OK' in S24, in a case where the capability information request IR3 is acquired from the terminal apparatus TE1, the printer PR supplies a capability notice CN3 including the gzip information, which indicates 'OK', to the terminal apparatus TE1. As a result, although not shown, the printer PR acquires the compressed print data from the terminal apparatus TE1 (YES in S100) and executes the printing processing including the decompression processing (S110 to S114).

Effects of this Illustrative Embodiment

In a situation where the compression efficiency of the print data is relatively high, when the terminal apparatus TE1 supplies the compressed print data to the printer PR, it is possible to rapidly provide the printed printing medium to the user because the communication time of the compressed print data is effectively shortened. However, in a situation where the compression efficiency of the print data is relatively low, even when the terminal apparatus TE1 supplies the compressed print data to the printer PR, communication time T1 of the compressed print data is not shortened so much. Also, in the printer PR, processing time T2 for which the decompression processing is executed for the compressed print data is required. In the situation where the compression efficiency of the print data is low, if the terminal apparatus TE1 supplies the non-compressed print data to the printer PR, communication time T3 of the non-compressed print data becomes longer than the communication time T1. However, since the printer PR does not have to execute the decompression processing, the processing time T2 is not required. That is, in the situation where the compression efficiency of the print data is low, since a relation of T3<T1+T2 can be established, when a configuration of supplying the non-compressed print data is adopted, it can be possible to rapidly provide the printed printing medium to the user, as compared to a configuration of supplying the compressed print data.

Considering the above situations, according to this illustrative embodiment, as shown in FIG. 4, in a case where the compression efficiency of the compressed print data PD1 is relatively low, the printer PR changes the gzip information from 'OK' to 'NG', even though it is possible to execute the gzip compression (S224). For example, in a situation where the user of the terminal apparatus TE1 frequently causes the printer PR to execute a printing by using the print data representing a photograph (i.e. the print data having a low compression efficiency), the gzip information is changed from 'OK' to 'NG' (S224). Thereafter, it is expected that the user causes the printer PR to execute the printing by using the print data representing a photograph. In this situation, in a case where the capability information request IR2 is acquired from the terminal apparatus TE1, the printer PR supplies the capability notice CN2 including the gzip information, which indicates 'NG', to the terminal apparatus TE1. As a result, the printer PR acquires the non-compressed print data PD2 from the terminal apparatus TE1, and executes the printing processing which does not include the decompression processing (S240). As shown in the case A, in a case where the non-compressed print data PD2 having the low compression efficiency is acquired, since the printer PR does not have to execute the decompression processing, it can be possible to rapidly provide the printed printing medium to the user. In this way, according to this illustrative embodiment, it can be possible to appropriately execute the printing using the print data.

Also, as shown in the case B, for example, in a situation where the user of the terminal apparatus TE1 frequently causes the printer PR to execute a printing using the print data representing a text (i.e. the print data having a high compression efficiency), the gzip information is changed from 'NG' to 'OK' (S244). Thereafter, it is expected that the user causes the printer PR to execute the printing using the print data representing a text. In this situation, in a case where the capability information request IR3 is acquired from the terminal apparatus TE1, the printer PR supplies the capability notice CN3 including the gzip information, which indicates 'OK', to the terminal apparatus TE1. As a result, the printer PR acquires the compressed print data from the terminal apparatus TE1, and executes the printing processing including the decompression processing. In a case where the compression efficiency of the compressed print data is high, since the communication time of the compressed print data is shortened, it can be possible to rapidly provide the printed printing medium to the user. In this way, according to this illustrative embodiment, it can be possible to appropriately execute the printing using the print data.

(Correspondence Relation)

In FIG. 4, the terminal apparatus TE1 is an example of the 'first external apparatus', the 'second external apparatus', and the 'third external apparatus'. The capability notice CN1 including the gzip information, which indicates 'OK', is an example of the 'first capability information, which includes the information indicating the specific processing capability'. The capability notice CN2 and the capability notice CN3 are examples of the 'second capability information' and the 'third capability information', respectively. The compressed print data PD1 and the non-compressed print data PD2 are examples of the 'first print data' and the 'second print data', respectively. The original designated image data of the compressed print data PD1 and the original designated image data of the non-compressed print data PD2 are examples of the 'first image data' and the 'second image data', respectively.

In FIG. 3, the processing of S110 to S114 is an example of the 'first printing processing', and the processing of S152 and S154 is an example of the 'second printing processing'. The decompression processing of S110 is an example of the 'specific processing'. The size ratio calculated in S120 and the size ratio calculated in S160 are examples of the 'first compression efficiency' and the 'second compression efficiency', respectively. The reference value '80%' used in S130 and the reference value '80%' used in S170 are examples of the 'first reference efficiency' and the 'second reference efficiency', respectively. The YES determination in S130 and the YES determination in S170 are examples of the 'first predetermined condition is satisfied' and the 'second predetermined condition is satisfied', respectively.

Modified Embodiment of Size Ratio

In the first illustrative embodiment, the size ratio is calculated by using the equation '(compressed data size/decompressed data size)×100(%)' in S120 and S160. Instead of this, the size ratio may be calculated using an equation '(decompressed data size/compressed data size)×100(%)', for example. In this modified embodiment, the greater a value of the size ratio, the compression efficiency is higher, and the smaller a value of the size ratio, the compression efficiency is lower. In S130, the CPU 22 may determine that the compression efficiency is lower than the reference efficiency in a case where the size ratio is smaller than the reference value (for example, '125%') indicating the reference efficiency. Also, in S170, the CPU 22 may determine that the compression efficiency is higher than the reference efficiency in a case where the size ratio is greater than the reference value (for example, '125%') indicating the reference efficiency. In the meantime, this modified embodiment can also be applied to the size ratio that is used in second and fourth illustrative embodiments, which will be described later.

Second Illustrative Embodiment

In this illustrative embodiment, the processing of S160, S162 and S170 of FIG. 3 is different from the first illustrative embodiment, and the respective processing of FIG. 3 other than the processing is the same as the first illustrative embodiment. In S160, the CPU 22 calculates the continuous pixel ratio of the plurality of pixels configuring the BMP data included in the non-compressed print data. Also, as shown in FIG. 1, the history information 34 in the memory 24 includes first history information to which the size ratio is to be added in S122 and second history information to which the continuous pixel ratio is to be added in S162. The first history information and the second history information include at most three index values, respectively. The configuration where the processing of S130 is executed by using the first history information is the same as the first illustrative embodiment.

Figure 5:
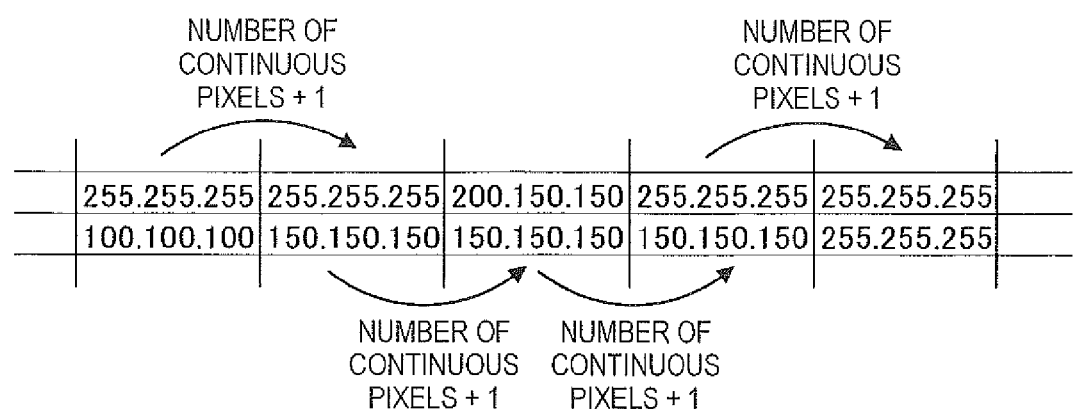
FIG. 5 is a diagram for explaining the second and third illustrative embodiments.

A method of calculating the continuous pixel ratio is described with reference to FIG. 5. FIG. 5 shows some of the plurality of pixels configuring the BMP data included in the non-compressed print data. The CPU 22 specifies one pixel of the plurality of pixels as a target pixel. Then, in a case where a pixel value (for example, a second value '255.255.255' from left on an upper line) of the target pixel and a pixel value (for example, the leftmost value '255.255.255' on the upper line) of an adjacent pixel adjacent to the left of the target pixel coincide with each other, the CPU 22 counts the target pixel as the continuous pixel. In a case where a pixel value (for example, a third value '200.150.150' from left on the upper line) of the target pixel and a pixel value (for example, a second value '255.255.255' from left on the upper line) of the adjacent pixel do not coincide with each other, the CPU 22 does not count the target pixel as the continuous pixel. The CPU 22 specifies each of the plurality of pixels as the target pixel, and calculates a total number of the continuous pixels. In the meantime, a method of specifying the target pixel is as follows. That is, the CPU 22 first sequentially specifies the target pixel from left towards right on the uppermost line of a plurality of lines configuring the plurality of pixels. When the CPU 22 specifies the rightmost target pixel, the CPU 22 sequentially specifies the target pixel from left towards right on a line below the target pixel by one. The CPU 22 can sequentially specify all the plurality of pixels as the target pixel by repeating the above processing. Then, the CPU 22 calculates the continuous pixel ratio by using an equation '(total number of continuous pixels/total number of pixels× 100(%)'. Here, the total number of pixels indicates the number of all pixels configuring the BMP data included in the non-compressed print data.

As described above, for example, when the print data is data representing a text, the total number of continuous pixels usually becomes large. In this case, the continuous pixel ratio becomes large, so that the compression efficiency is increased. Also, for example, when the print data is data representing a photograph, the total number of continuous pixels usually becomes small. In this case, the continuous pixel ratio becomes small, so that the compression efficiency is decreased. That is, although the compression efficiency becomes lower as the size ratio becomes larger, the compression efficiency becomes higher as the continuous pixel ratio becomes larger.

In S162 of FIG. 3, the CPU 22 deletes the oldest continuous pixel ratio of the three continuous pixel ratios included in the second history information in the memory 24, and adds the continuous pixel ratio calculated in S160 to the second history information. Thereby, the three latest continuous pixel ratios are included in the second history information.

In S170, in a case where the three continuous pixel ratios included in the second history information are all greater than the reference value '20%', the CPU 22 determines that the compression efficiency is higher than the reference efficiency, for all the three continuous pixel ratios (YES in S170), and proceeds to S172. On the other hand, when at least one of the three continuous pixel ratios is equal to or smaller than the reference value '20%', the CPU 22 determines that the compression efficiency is not higher than the reference efficiency (NO in S170).

Also in this illustrative embodiment, like the first illustrative embodiment, it is possible to appropriately execute the printing by using the print data. Also, unlike the first illustrative embodiment, in S160 of FIG. 3, since the printer PR does not have to compress the non-compressed print data, it is not necessary to provide a program for compressing the non-compressed print data. For this reason, a smaller program capacity is required in the memory 24. In this illustrative embodiment, the reference value '20%' that is to be used in S170 is an example of the 'second reference efficiency'.

Modified Embodiment of Continuous Pixel Ratio

In the second illustrative embodiment, in S160, the continuous pixel ratio is calculated by using the equation '(total number of continuous pixels/total number of pixels)× 100(%)'. Instead of this, in S160, the continuous pixel ratio may be calculated by using an equation '(total number of discontinuous pixels/total number of pixels)×100(%)'. Here, the discontinuous pixel is a pixel having a pixel value that does not coincide with a pixel value of an adjacent pixel. In the example of FIG. 5, since a pixel value (i.e. '200.150.150') of the third target pixel from left on the upper line does not coincide with a pixel value (i.e. '255.255.255') of an adjacent pixel adjacent to the left of the target pixel, the target pixel is counted as the discontinuous pixel. The greater a value of the discontinuous pixel ratio, the compression efficiency is lower, and the smaller a value of the discontinuous pixel, the compression efficiency is higher. In this modified embodiment, in S170, in a case where the discontinuous pixel ratio is smaller than the reference value (for example, '80%') indicating the reference efficiency, the CPU 22 may determine that the compression efficiency is higher than the reference efficiency. In the meantime, also in the third illustrative embodiment which will be described later, the discontinuous pixel ratio may be applied instead of the continuous pixel ratio.

Third Illustrative Embodiment

In this illustrative embodiment, the processing of S120, S122, S130, S160, S162 and S170 of FIG. 3 is different from the first illustrative embodiment, and the respective processing of FIG. 3 other than the corresponding processing is the same as the first illustrative embodiment. In each of S120 and S160, the CPU 22 calculates the continuous pixel ratio by using the same method as the second illustrative embodiment. Also, as shown in FIG. 1, the history information 34 in the memory 24 includes three continuous pixel ratios at most. The three continuous pixel ratios included in the history information 34 may include both the continuous pixel ratio calculated in S120 the continuous pixel ratio calculated in S160.

In S122, the CPU 22 deletes the oldest continuous pixel ratio of the three the continuous pixel ratios included in the history information 34 in the memory 24, and adds the continuous pixel ratio calculated in S120 to the history information 34. Thereby, the three latest continuous pixel ratios are included in the history information 34.

In S130, in a case where the three continuous pixel ratios included in the history information 34 are all smaller than the reference value '20%', the CPU 22 determines that the compression efficiency is lower than the reference efficiency for all the three continuous pixel ratios (YES in S130), and proceeds to S132. On the other hand, in a case where at least one of the three continuous pixel ratios is equal to or greater than the reference value '20%', the CPU 22 determines that the compression efficiency is not lower than the reference efficiency (NO in S130). The processing of S170 is the same as the second illustrative embodiment.

Also in this illustrative embodiment, like the first illustrative embodiment, it is possible to appropriately execute the printing by using the print data, and like the second illustrative embodiment, a smaller program capacity is required in the memory 24. In this illustrative embodiment, the continuous pixel and the continuous pixel ratio calculated in S120 are examples of the 'specific pixel' and the 'first compression efficiency', respectively.

Meanwhile, in a modified embodiment, the CPU 22 may calculate the continuous pixel ratio in S120 of FIG. 3, like the third illustrative embodiment, and may calculate the size ratio in S160, like the first illustrative embodiment. In this modified embodiment, the history information 34 in the memory 24 includes the first history information to which the continuous pixel ratio is to be added in S122 and the second history information to which the size ratio is to be added in S162.

Fourth Illustrative Embodiment

FIG. 6

In this illustrative embodiment, the size ratio for each terminal apparatus is stored as the history information 34. The history information 34 includes the maximum three size ratios for each terminal apparatus. For example, the history information 34 includes the maximum three size ratios in association with a MAC address of the terminal apparatus TE1, and the maximum three size ratios in association with a MAC address of the terminal apparatus TE2.

In S122 of FIG. 3, the CPU 22 specifies a MAC address of the terminal apparatus that has supplied the print data acquired in S100, (i.e. the target terminal apparatus), deletes the oldest size ratio of the three size ratios corresponding to the MAC address included in the history information 34 in the memory 24, and adds the size ratio calculated in S120 to the history information 34 in association with the MAC address. The processing of S162 is likewise executed. Further, in this illustrative embodiment, the processing of S130, S132, S164, S170 and S172 is not executed.

(Specific Case)

Figure 6:
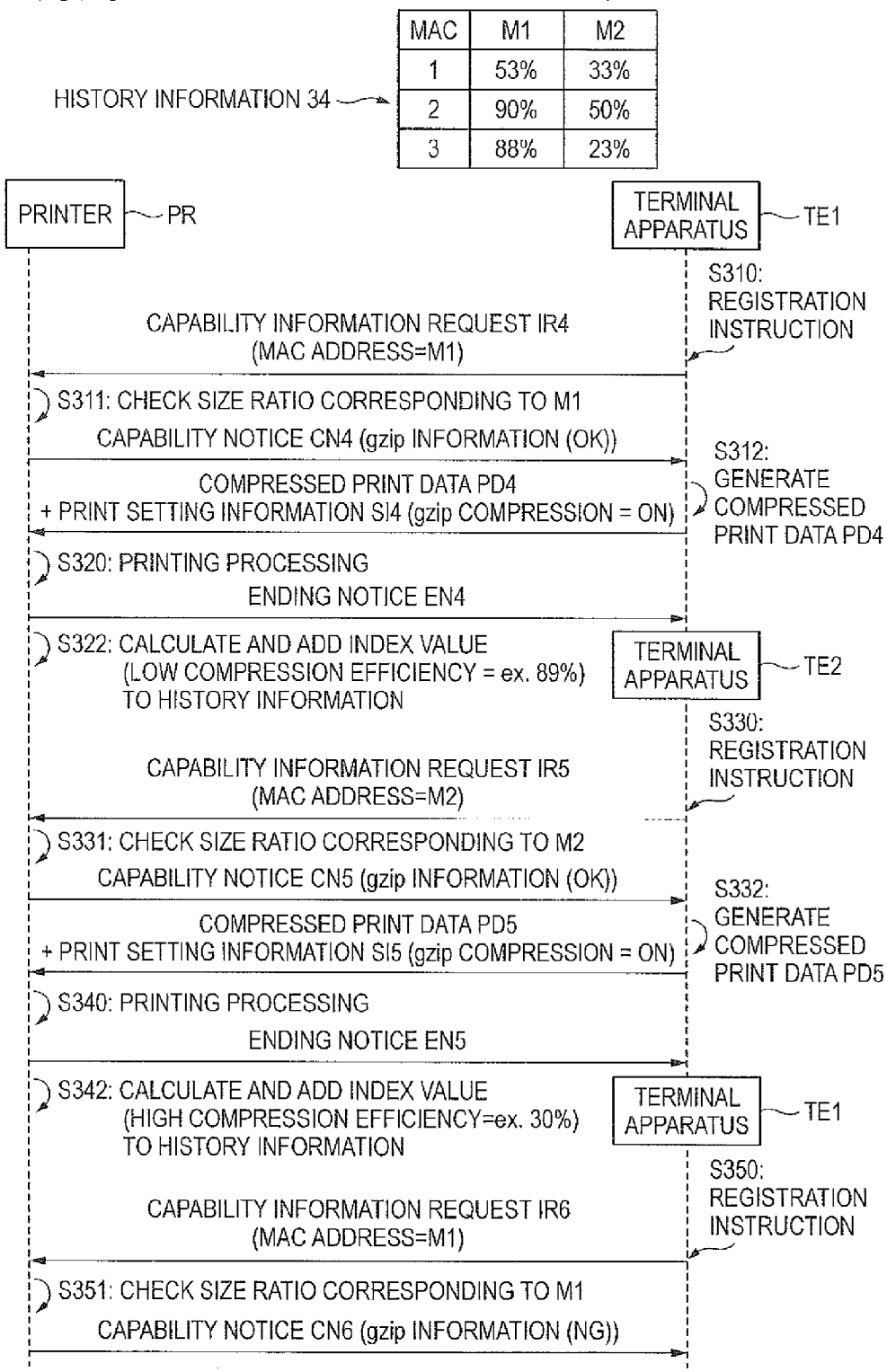
FIG. 6 is a sequence diagram of a fourth illustrative embodiment.

A specific case of this illustrative embodiment is described with reference to FIG. 6. In an example of FIG. 6, the history information 34 includes the three size ratios corresponding to the MAC address 'M1' of the terminal apparatus TE1 and the three size ratios corresponding to the MAC address 'M2' of the terminal apparatus TE2. More specifically, in the three size ratios corresponding to the MAC address 'M1', the oldest size ratio '53%' is equal to or smaller than the reference value '80%' (i.e. the compression efficiency is relatively high), and the two other size ratios '90%' and '88%' are greater than the reference value '80%' (i.e. the compression efficiency is relatively low). Also, all the three size ratios (33%' and the like) corresponding to the MAC address 'M2' are equal to or smaller than the reference value '80%' (i.e. the compression efficiency is relatively high).

In a case where the registration instruction is received from the user in S310, the terminal apparatus TE1 supplies a capability information request IR4 including the MAC address 'M1' to the printer PR. In a case where the capability information request IR4 is acquired from the terminal apparatus TE1, the printer PR reads out the three size ratios corresponding to the MAC address 'M1' from the history information 34 in S311. Since at least one size ratio '53%' of the three size ratios is equal to or smaller than the reference value '80%', i.e. since the compression efficiency of the print data previously acquired from the terminal apparatus TE1 is higher than the reference efficiency, the printer PR supplies a capability notice CN4 including the gzip information, which indicates 'OK', to the terminal apparatus TE1.

In a case where the capability notice CN4 is acquired from the printer PR, the terminal apparatus TE1 generates compressed print data PD4 from the designated image data, in S312. Then, the terminal apparatus TE1 supplies the compressed print data PD4 and print setting information SI4 including the character string, which indicates the 'gzip compression=ON', to the printer PR. In a case where the compressed print data PD4 and the print setting information SI4 are acquired from the terminal apparatus TE1 (a trigger of the processing of FIG. 3), the printer PR executes the printing processing including the decompression processing in S320 (YES in S100, S110 to S114). Then, the printer PR supplies an ending notice EN4 to the terminal apparatus TE1 (S116).

Then, in S322, the printer PR calculates a size ratio '89%' having the compression efficiency lower than the reference efficiency (S120), deletes the oldest size ratio '53%' corresponding to the MAC address 'M1', and adds the calculated size ratio '89%' to the history information 34 in association with the MAC address 'M1' (S122). As a result, all the three size ratios corresponding to the MAC address 'M1' become greater than the reference value '80%'. That is, all the compression efficiencies of the three latest print data previously acquired from the terminal apparatus TE1 become lower than the reference efficiency.

After that, in a case where the terminal apparatus TE2, which is different from the terminal apparatus TE1, receives the registration instruction from the user in S330, the terminal apparatus TE2 supplies a capability information request IR5 including the MAC address 'M2' to the printer PR. In a case where the capability information request IR5 is acquired from the terminal apparatus TE2, the printer PR reads out the three size ratios corresponding to the MAC address 'M2' from the history information 34 in S331. Since at least one size ratio of the three size ratios is equal to or smaller than the reference value '80%', the printer PR supplies a capability notice CN5 including the gzip information, which indicates 'OK', to the terminal apparatus TE2.

In a case where the capability notice CN5 is acquired from the printer PR, the terminal apparatus TE2 generates compressed print data PD5 from the designated image data, in S332. Then, the terminal apparatus TE2 supplies the compressed print data PD5 and print setting information SI5 including the character string, which indicates the 'gzip compression=ON', to the printer PR. In a case where the compressed print data PD5 and the print setting information SI5 are acquired from the terminal apparatus TE2 (a trigger of the processing of FIG. 3), the printer PR executes the printing processing including the decompression processing in S340 (YES in S100, S110 to S114). Then, the printer PR supplies an ending notice EN5 to the terminal apparatus TE2 (S116).

Then, in S342, the printer PR calculates a size ratio '30%' having the relatively high compression efficiency (S120), deletes the oldest size ratio '33%' corresponding to the MAC address 'M2', and adds the calculated size ratio '30%' to the history information 34 in association with the MAC address 'M2' (S122).

After that, in a case where the registration instruction is received from the user in S350, the terminal apparatus TE1 supplies a capability information request IR6 to the printer PR. In a case where the capability information request IR6 is acquired from the terminal apparatus TE1, the printer PR reads out the three size ratios corresponding to the MAC address 'M1' from the history information 34 in S351. Since all the three size ratios are equal to or greater than the reference value '80%', the printer PR supplies a capability notice CN6 including the gzip information, which indicates 'NG', to the terminal apparatus TE1. As a result, although not shown, the printer PR acquires the non-compressed print data from the terminal apparatus TE1 (YES in S100), and executes the printing processing, which does not include the decompression processing (S152 and S154).

Effects of this Illustrative Embodiment

According to this illustrative embodiment, in a case where the capability information request IR4 is acquired from the terminal apparatus TE1, the printer PR supplies the capability notice CN4 including the gzip information, which indicates 'OK', to the terminal apparatus TE1. In a case where the compression efficiency of the compressed print data PD4 is lower than the reference efficiency and the capability information request IR6 is acquired from the terminal apparatus TE1, the printer PR supplies the capability notice CN6 including the gzip information, which indicates 'NG', to the terminal apparatus TE1. For this reason, in a case where the compressed print data PD6 having the relatively low compression efficiency is supplied from the terminal apparatus TE1 to the printer PR, the printer PR does not have to execute the decompression processing, so that it can be possible to rapidly provide the user with the printed printing medium.

On the other hand, in a case where the compression efficiency of the compressed print data PD4 is lower than the reference efficiency and the capability information request IR5 is acquired from the terminal apparatus TE2 different from the terminal apparatus TE1, the printer PR supplies the capability notice CN5 including the gzip information, which indicates 'OK', to the terminal apparatus TE2. In this way, according to this illustrative embodiment, even though all the three size ratios associated with the MAC address 'M1' of the terminal apparatus TE1 are lower than the reference efficiency, in a case where the capability information request IR5 is acquired from the terminal apparatus TE2, the printer PR supplies the capability notice CN5 including the gzip information, which indicates 'OK', to the terminal apparatus TE2. For this reason, in a case where the compressed print data PD5 having the relatively high compression efficiency is supplied from the terminal apparatus TE2 to the printer PR, it can be possible to rapidly provide the user with the printed printing medium because the communication time of the compressed print data PD5 may be short. For this reason, it can be possible to appropriately execute the printing using the print data, in accordance with the terminal apparatuses TE1, TE2.

(Correspondence Relation)

In this illustrative embodiment, the terminal apparatus TE1 is an example of the 'first external apparatus' and the 'second external apparatus', and the terminal apparatus TE2 is an example of the 'fourth external apparatus'. The capability information requests IR4 to IR6 are examples of the 'predetermined request'. The capability notice CN4, the capability notice CN6 and the capability notice CN5 are examples of the 'first capability information', the 'second capability information' and the 'fourth capability information', respectively.

Fifth Illustrative Embodiment

In the first to fourth illustrative embodiments, the printer PR is configured to change whether to supply the capability notice including the gzip information, which indicates 'OK', or the capability notice including the gzip information, which indicates 'NG', from the standpoint of the compression efficiency of the print data. In contrast, in this illustrative embodiment, the printer PR is configured to change whether to supply the capability notice including the data format information, which indicates 'PDF', or the capability notice including the data format information, which does not indicate 'PDF', depending on whether the rasterization processing for the print data having a PDF format is successful or fails.

Figure 7:
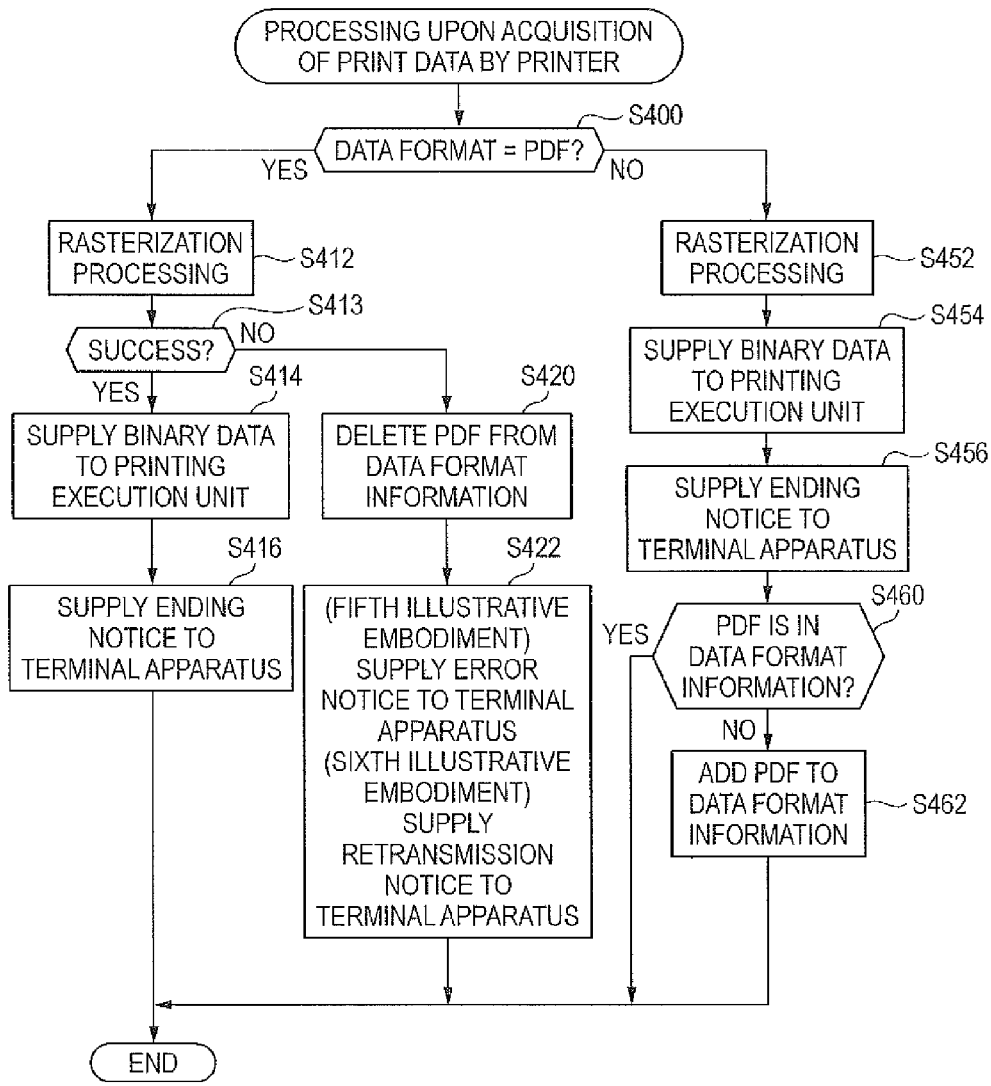
FIG. 7 is a flowchart showing processing upon acquisition of print data in fifth and sixth illustrative embodiments.

(Processing Upon Acquisition of Print Data; FIG. 7)

The CPU 22 of the printer PR executes processing upon acquisition of print data of FIG. 7, instead of the processing of FIG. 3. In a case where the print data and the print setting information are acquired from the target terminal apparatus, the CPU 22 starts the processing of FIG. 7. Here, the processing of FIG. 7 includes the printing processing in S40 of FIG. 2 and the supply of the ending notice EN.

In S400, the CPU 22 determines whether the character string, which indicates the 'data format=PDF', is included in the print setting information. In a case where the character string, which indicates the 'data format=PDF', is included in the print setting information, i.e., in a case where the print data having a PDF format is acquired, the CPU 22 determines YES in S400, and executes the printing processing of S412 to S414. On the other hand, in a case where the character string, which indicates the 'data format=PDF', is not included in the print setting information, i.e., in a case where the print data having a JPEG or PWG format is acquired, the CPU 22 executes the printing processing of S452 and S454. In the meantime, the printing processing of S412 to S414 and the printing processing of S452 and S454 indicates the specific processing of the printing processing in S40 of FIG. 2.

In S412, the CPU 22 executes the rasterization processing of rasterizing the print data having a PDF format, thereby generating the binary data. The processing of S412 is the same as the processing of S112 of FIG. 3. However, in this illustrative embodiment, it is assumed that a case where the printer PR cannot rasterize the print data having a PDF format may occur. For example, in a PDF, a variety of commands may be used. However, in this illustrative embodiment, the printer PR does not support all the commands to be used in the PDF. That is, the printer PR does not support a command of instructing a special font type, a command of instructing a special gradation, a command using JPEG2000, a command using JPEG2, and the like. Therefore, in a case where the print data having a PDF format including the special command is acquired, the CPU 22 cannot rasterize the print data, so that it is not possible to generate the binary data. Like this, in S412, the CPU 22 executes trial processing of trying the rasterization of the print data having a PDF format.

In S413, the CPU 22 determines whether the rasterization processing of S412 is successful. In a case where the rasterization processing is successful and the binary data is thus generated, the CPU 22 determines YES in S413, and executes processing of S414 and S416. The processing of S414 and S416 is the same as the processing of S114 and S116 of FIG. 3. When the processing of S416 is over, the processing of FIG. 7 is over. On the other hand, in a case where the rasterization processing fails and thus the binary data is not generated, the CPU 22 determines NO in S413, and proceeds to S420.

In S420, the CPU 22 deletes 'PDF' from the data format information included in the capability information 32 in the memory 24. Thereby, thereafter, in a case where the capability information request is acquired from the target terminal apparatus or another terminal apparatus, the CPU 22 can supply the capability notice including the data format information, which does not indicate 'PDF', to the terminal apparatus, so that it is possible to acquire the print data having a data format different from the PDF format from the terminal apparatus.

In S422, the CPU 22 supplies an error notice including a message which indicates that the print data cannot be rasterized, i.e., a message which indicates that the printing cannot be executed, to the target terminal apparatus. Thereby, since the message is displayed on the target terminal apparatus, the user can recognize that the printing cannot be executed. When the processing of S422 is over, the processing of FIG. 7 is over.

On the other hand, in a case where the print data having a JPEG or PWG format is acquired, the CPU 22 sequentially executes processing of S452 to S456. The processing of S452 to S456 is the same as the processing of S112 to S116 (i.e. S152 to S156) of FIG. 3.

In S460, the CPU 22 determines whether 'PDF' is described in the data format information included in the capability information 32 in the memory 24. In a case where it is determined that whether 'PDF' is described in the data format information (YES in S460), the CPU 22 skips over S462 and ends the processing of FIG. 7. On the other hand, in a case where it is determined that 'PDF' is not described in the data format information (NO in S460), the CPU 22 adds 'PDF' to the data format information. Thereby, thereafter, in a case where the capability information request is acquired from the target terminal apparatus or another terminal apparatus, the CPU 22 can supply the capability notice including the data format information, which indicates 'PDF', to the terminal apparatus, so that it is possible to acquire the print data having a PDF format from the terminal apparatus. When the processing of S462 is over, the processing of FIG. 7 is over.

Figure 8:
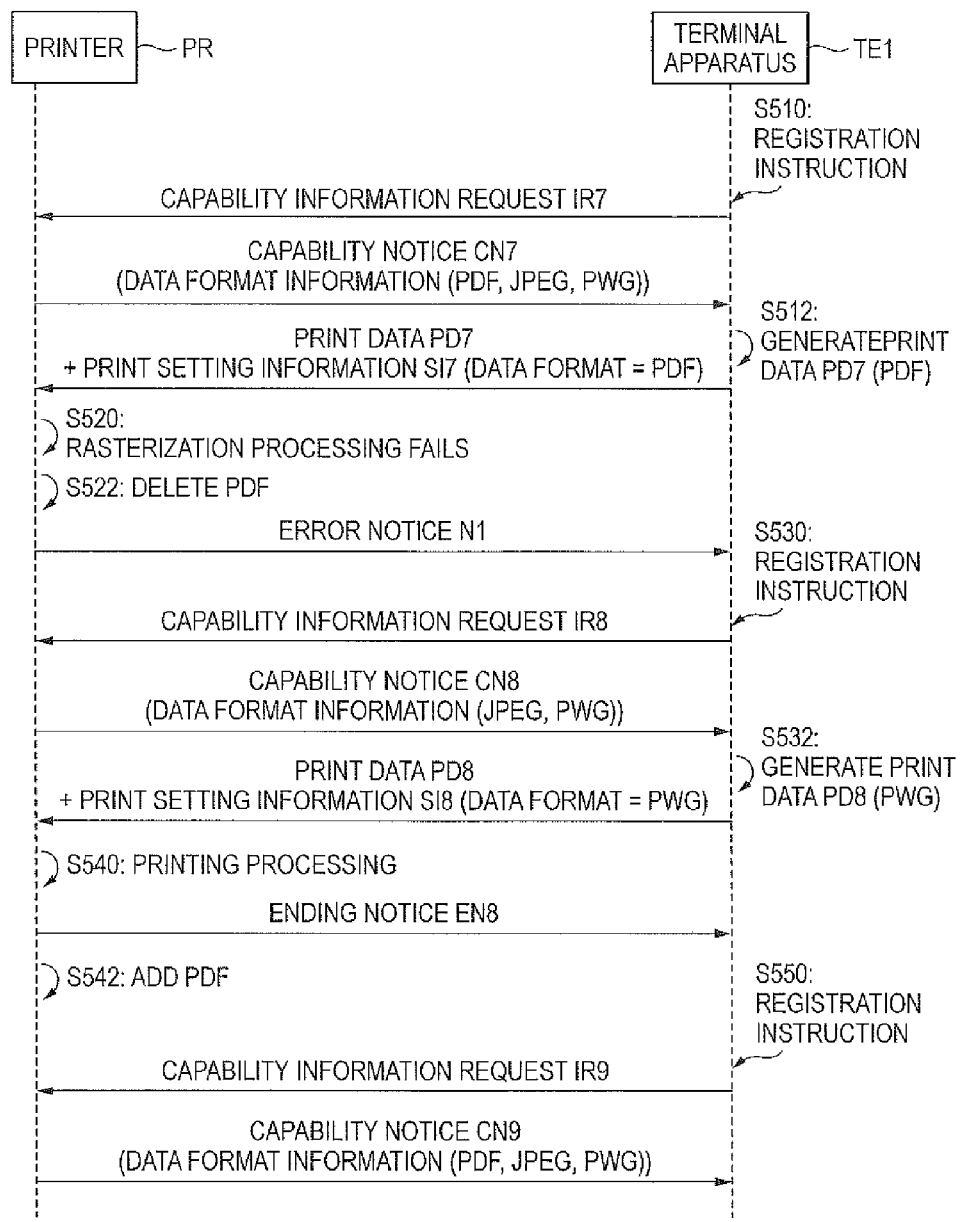
FIG. 8 is a sequence diagram of the fifth illustrative embodiment.

(Specific Case; FIG. 8)

A specific case of this illustrative embodiment is described with reference to FIG. 8. In a case where the registration instruction is received from the user in S510, the terminal apparatus TE1 supplies a capability information request IR7 to the printer PR. In a case where the capability information request IR7 is acquired from the terminal apparatus TE1, the printer PR supplies a capability notice CN7 including the data format information, which indicates 'PDF', to the terminal apparatus TE1.

In a case where the capability notice CN7 is acquired from the printer PR, the terminal apparatus TE1 generates print data PD7 having a PDF format from the designated image data, in S512. Then, the terminal apparatus TE1 supplies the print data PD7, and print setting information SI7 including the character string, which indicates the 'data format=PDF', to the printer PR. In a case where the print data PD7 and the print setting information SI7 are acquired from the terminal apparatus TE1 (a trigger of the processing of FIG. 7), the printer PR tries to execute the rasterization processing in S520 (S412) but fails in the rasterization processing. For this reason, in S522, the printer PR deletes 'PDF' from the data format information in the capability information 32 (S420). Then, the printer PR supplies an error notice N1 to the terminal apparatus TE1 (S422).

In a case where the user of the terminal apparatus TE1 recognizes that the printer PR cannot execute the printing, the user again inputs the registration instruction to the terminal apparatus TE1 in S530. In a case where the registration instruction is received from the user in S530, the terminal apparatus TE1 supplies a capability information request IR8 to the printer PR. In a case where the capability information request IR8 is acquired from the terminal apparatus TE1, the printer PR supplies a capability notice CN8 including the data format information (i.e. the data format information indicating only 'JPEG' and 'PWG'), which does not indicate 'PDF', to the terminal apparatus TE1 because 'PDF' has been deleted from the data format information in S522.

In a case where the capability notice CN8 is acquired from the printer PR, the terminal apparatus TE1 generates print data PD8 having a PWG format different from the PDF format from the designated image data, in S532. Here, the user of the terminal apparatus TE1 again designates the same designated image data as the designated image data for which the rasterization processing has failed. That is, the print data PD8 generated in S532 and the print data PD7 generated in S512 are generated from the same image data. Then, the terminal apparatus TE1 supplies the print data PD8 and print setting information SI8 including the character string, which indicates the 'data format=PWG', to the printer PR. In a case where the print data PD8 and the print setting information SI8 are acquired from the terminal apparatus TE1 (a trigger of the processing of FIG. 7), the printer PR executes the printing processing in S540 (S452 and S454), and supplies an ending notice EN8 to the terminal apparatus TE1 (S456). In S542, the printer PR adds 'PDF' to the data format information in the capability information 32 (S462).

Thereafter, in a case where the registration instruction is received from the user in S550, the terminal apparatus TE1 supplies a capability information request IR9 to the printer PR. In a case where the capability information request IR9 is acquired from the terminal apparatus TE1, the printer PR supplies a capability notice CN9 including the data format information, which indicates 'PDF', to the terminal apparatus TE1 because 'PDF' has been added to the data format information in S542. As a result, although not shown, the printer PR can acquire the print data having a PDF format from the terminal apparatus TE1 (YES in S400).

In a modified embodiment, the registration instruction of S550 may be executed on the terminal apparatus TE2 different from the terminal apparatus TE1. In this case, the printer PR acquires a capability information request IR9 from the terminal apparatus TE2, and supplies a capability notice CN9 including the data format information, which indicates 'PDF', to the terminal apparatus TE2. As a result, the printer PR can acquire the print data having a PDF format from the terminal apparatus TE2 (YES in S400).

Effects of this Illustrative Embodiment

In this illustrative embodiment, as shown in FIG. 8, in a case where the rasterization processing for the print data PD7 having a PDF format fails (S520), the printer PR deletes 'PDF' from the data format information in the capability information 32, even though the printer PR supports the PDF format (S522). For this reason, in a case where the capability information request IR8 is acquired from the terminal apparatus TE1, the printer PR supplies the capability notice CN8 including the data format information, which does not indicate 'PDF', to the terminal apparatus TE1. As a result, the printer PR can acquire the print data PD8 having a PWG format different from a PDF format from the terminal apparatus TE1, so that it is possible to appropriately execute the printing processing. That is, it is possible to appropriately provide the user with the printed printing medium. In this way, according to this illustrative embodiment, it can be possible to appropriately execute the printing by using the print data.

Also, after executing the printing using the print data PD8, the printer PR adds 'PDF' to the data format information in the capability information 32 (S542). Thereby, in a case where the capability information request IR9 is acquired from the terminal apparatus TE1, the printer PR supplies a capability notice CN9 including the data format information, which indicates 'PDF', to the terminal apparatus TE1. As a result, the printer PR can acquire the print data having a PDF format from the terminal apparatus TE1. Then, in a case where the rasterization processing for the print data is successful, the printer PR can appropriately execute the printing by using the print data.

Whether the print data having a PDF format includes the special command may depend on a content of the original image data of the print data. For example, in a case where the image data includes a command of instructing a special font type, the print data having a PDF format generated from the image data can also include a command of instructing the special font type. In a case where the image data does not include a command of instructing the special font type, there is a high possibility that the print data having a PDF format generated from the image data can also does not include a command of instructing the special font type. In the case shown in FIG. 8, the rasterization processing for the print data PD7 having a PDF format generated from the image data specified by the terminal apparatus fails, and then the printing of the print data PD8 generated from the specific image data by the terminal apparatus TE1 is executed. Thereafter, if another print data having a PDF format is generated from image data different from the specific image data by the terminal apparatus TE1, there is a possibility that the other print data does not include the special command. Considering this situation, the printer PR adds 'PDF' to the data format information in the capability information 32 after executing the printing using the print data PD8. As a result, in a case where the capability information request IR9 is acquired from the terminal apparatus TE1, the printer PR can supply the capability notice CN9 including the data format information, which indicates 'PDF', to the terminal apparatus TE1. Therefore, in a case where the other print data is acquired from the terminal apparatus TE1, the printer PR can successfully perform the rasterization processing for the separate print data and can appropriately execute the printing.

Also, whether the print data having a PDF format includes the special command may depend on the processing of the terminal apparatus (for example, TE1). For example, even though the original image data of the print data PD7 having a PDF format does not include the special command, the terminal apparatus TE1 can generate the print data PD7 including the special command when generating the print data PD7 by using the image data. Meanwhile, in a case where the image data does not include the special command, the terminal apparatus TE2 different from the terminal apparatus TE1 can generate the print data, which does not include the special command, when generating the separate print data by using the image data. Considering this situation, the printer PR adds 'PDF' to the data format information in the capability information 32 after executing the printing using the print data PD8. As a result, in a case where the capability information request IR9 is acquired from the terminal apparatus TE2, the printer PR can supply the capability notice CN9 including the data format information, which indicates 'PDF', to the terminal apparatus TE2. Therefore, in a case where the print data having a PDF format is acquired from the terminal apparatus TE2, the printer PR succeeds in the rasterization processing for the print data and can appropriately execute the printing.

(Correspondence Relation)

In FIG. 8, the terminal apparatus TE1 is an example of the 'first external apparatus', the 'second external apparatus', and the 'third external apparatus'. The PDF is an example of the 'predetermined data format'. The capability notice CN7 including the data format information, which indicates 'PDF', is an example of the 'first capability information including the information, which indicates the specific processing capability'. The capability notice CN8 and the capability notice CN9 are examples of the 'second capability information' and the 'third capability information', respectively. The print data PD7 and the print data PD8 are examples of the 'first print data' and the 'second print data', respectively. The original designated image data of the print data PD7 and the original designated image data of the print data PD8 are examples of the 'first image data' and the 'second image data', respectively. In FIG. 7, the processing of S412 to S414 is an example of the 'first printing processing', and the processing of S452 and S454 is an example of the 'second printing processing'. The rasterization processing of S412 is an example of the 'specific processing'. The determination NO in S413 is an example of the 'first predetermined condition is satisfied.'

Sixth Illustrative Embodiment

In this illustrative embodiment, the contents of the processing of S422 of FIG. 7 are different from the fifth illustrative embodiment. Specifically, the CPU 22 supplies a retransmission notice for instructing retransmission of the capability information request to the target terminal apparatus. Thereby, in a case where the retransmission notice is acquired from the printer PR, the target terminal apparatus supplies the capability information request to the printer PR even though the registration instruction is not received from the user.

Figure 9:
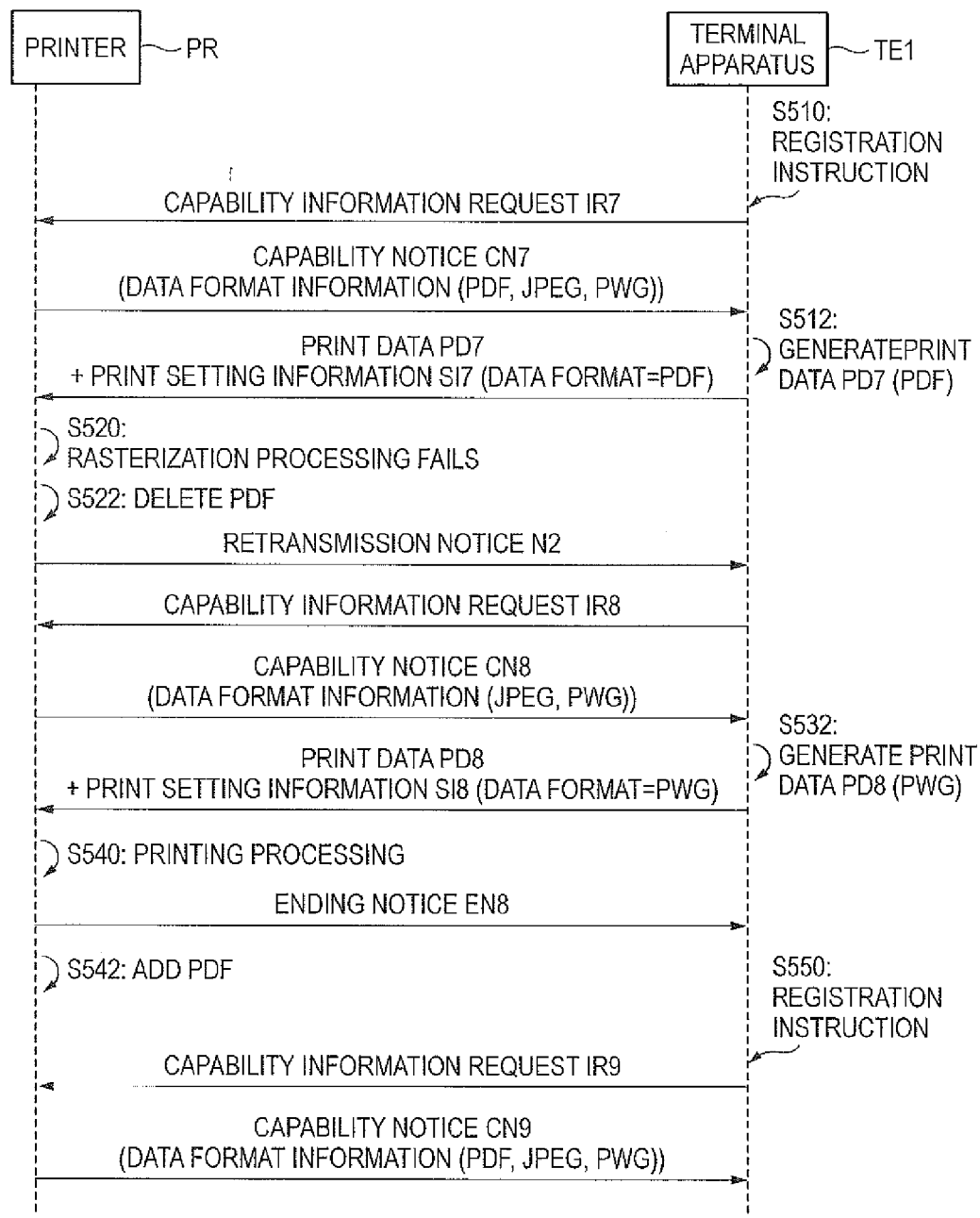
FIG. 9 is a sequence diagram of the sixth illustrative embodiment.

In a case shown in FIG. 9, a retransmission notice N2 is supplied to the terminal apparatus TE1, instead of the error notice N1 of FIG. 8. In a case where the retransmission notice N2 is acquired from the printer PR, the terminal apparatus TE1 automatically supplies the capability information request IR8 to the printer PR even though the registration instruction of S530 is not received from the user. Thereby, the terminal apparatus TE1 acquires the capability notice CN8 including the data format information, which does not indicate 'PDF', from the printer PR, generates the print data PD8 having a PWG format different from the PDF format (S532), and supplies the print data PD8 to the printer PR.

Also in this illustrative embodiment, it is possible to appropriately execute the printing using the print data, like the fifth illustrative embodiment. Also, since the user of the terminal apparatus TE1 does not have to issue the registration instruction of S530, it is possible to reduce the user's load.

Modified Embodiment 1 of Fifth and Sixth Illustrative Embodiments

In the fifth and sixth illustrative embodiments, in a case where the capability notice CN8 of FIG. 8 is acquired from the printer PR, the target terminal apparatus again needs to display the setting screen (see S30 of FIG. 2) to receive the designation instruction from the user (see S32). In contrast, in a modified embodiment, in S442 of FIG. 7, the CPU 22 supplies a retransmission notice including the data format information, which does not indicate 'PDF', to the target terminal apparatus. The retransmission notice is a notice for instructing retransmission of the print data, not a notice for instructing retransmission of the capability information request. In this modified embodiment, in a case where the retransmission notice is acquired from the printer PR, the target terminal apparatus generates the print data having a data format different from the PDF format and supplies the print data to the present invention, even when the registration instruction is not received from the user and the setting screen is not again displayed or the designation instruction is not received from the user. Since the user does not have to issue the designation instruction, it is possible to further reduce the user's load.

Modified Embodiment 2 of Fifth and Sixth Illustrative Embodiments

In the fifth and sixth illustrative embodiments, the printer PR may determine whether to supply the capability notice including the data format information, which indicates 'PDF', or the capability notice including the data format information, which does not indicate 'PDF', for each terminal apparatus. Specifically, instead of S420 of FIG. 7, the CPU 22 executes processing of associating and storing the MAC address of the target terminal apparatus and flag information, which indicates that the rasterization processing fails, in the memory 24. Also, instead of the processing of S460 and S462 of FIG. 7, the CPU 22 may execute the following processing. That is, in a case where the flag information is stored with being associated with the MAC address of the target terminal apparatus in the memory 24, the CPU 22 deletes the flag information. Then, in a case where the capability information request is acquired from the terminal apparatus, the CPU 22 determines whether the flag information is stored with being associated with the MAC address of the target terminal apparatus in the memory 24. In a case where it is determined that the flag information is stored, the CPU 22 supplies the capability notice including the data format information, which does not indicate 'PDF', to the terminal apparatus, and in a case where it is determined that the flag information is not stored, the CPU 22 supplies the capability notice including the data format information, which indicates 'PDF', to the terminal apparatus. According to this modified embodiment, the printer PR can appropriately supply the capability notice in accordance with the terminal apparatuses TE1, TE2.

Although the specific examples of the present invention have been described in detail, they are just exemplary and do not limit the claims. The technology defined in the claims includes a variety of modifications and changes to the above specific examples. Modified embodiments of the above specific examples will be described hereinafter.

Modified Embodiment 1

In the first to fourth illustrative embodiments, the printer PR has the decompression capability of decompressing the print data compressed by using the gzip method. Instead of this, the printer PR may have a decompression capability of decompressing the print data compressed by using other compression methods. The other compression methods may include LZ (abbreviation of Lempel-Ziv), LZW (abbreviation of Lempel-Ziv-Welch), LZSS (abbreviation of Lempel-Ziv-Storer-Szymanski), Deflate and the like. That is, the 'predetermined compression method' is not limited to the gzip method and may be another compression method.

Modified Embodiment 2

The printer PR may have a decompression capability corresponding to a plurality of types of compression methods. The printer PR may be configured to supply a capability notice including compression method information, which indicates the plurality of types of compression methods, to the terminal apparatus (for example, TE1) and to acquire print data using a specific compression method of the plurality of types of compression methods, and may supply a capability notice including compression method information, which does not indicate the specific compression method and indicates another compression method, to the terminal apparatus in a case where the compression efficiency of the print data is lower than the reference efficiency. Thereafter, in case of compressing the print data by using the specific compression method, in a case where the compression efficiency is higher than the reference efficiency, the printer PR may supply the capability notice including the compression method information, which indicates the plurality of types of compression methods, to the terminal apparatus. In this modified embodiment, the capability notice including the compression method information, which indicates the plurality of types of compression methods, is an example of the 'first capability information, which includes the information indicating the specific processing capability'. Also, the capability notice including the compression method information, which does not indicate the specific compression method and indicates another compression method, is an example of the 'second capability information, which does not include the information indicating the specific processing capability'.

Modified Embodiment 3

In the fifth and sixth illustrative embodiments, it is assumed that the printer PR fails in the rasterization processing for the print data having a PDF format. Instead of this, in a case where the rasterization processing for the print data having another data format (for example, JPEG format, PWG format, and the like) fails, the printer PR may delete another data format from the data format information. That is, the 'predetermined data format' is not limited to the PDF format and may be another data format.

Modified Embodiment 4

Unlike the first to sixth illustrative embodiments where the contents of the gzip information or the data format information are changed depending on the print data, the printer PR may change a content of the resolution information, depending on the print data. Even when an image including a photograph is printed with a relatively low resolution, the user can usually recognize a content of the photograph. On the other hand, when an image including a text is printed with a relatively low resolution, the user may not be able to recognize a content of the text. Considering this situation, according to this modified embodiment, the printer PR changes the content of the resolution information, depending on the print data, as follows.

For example, in a case where the print data represents an image including a photograph, the printer PR may delete 600 dpi, which is the high resolution, from the resolution information included in the capability information 32 in the memory 24. In this case, thereafter, in a case where the capability information request is acquired from the terminal apparatus, the printer PR supplies the capability notice including the resolution information, which does not indicate 600 dpi, to the terminal apparatus. Thereby, the printer PR can acquire the print data having a low resolution from the terminal apparatus. Thereby, a data size of the print data is reduced, so that the communication load between the printer PR and the terminal apparatus is reduced. Further, the printer PR can execute the rasterization processing of the print data with the relatively low processing load.

Also, in a case where the print data indicates an image including a text, the printer PR may add 600 dpi to the resolution information included in the capability information 32 in the memory 24. In this case, thereafter, in a case where the capability information request is acquired from the terminal apparatus, the printer PR supplies the capability notice including the resolution information, which indicates 600 dpi, to the terminal apparatus. Thereby, the printer PR can acquire the print data having the high resolution from the terminal apparatus. Thereby, in a case where the print data represents an image including a text, it is possible to appropriately provide the user with a printed printing medium from which the contents of the text can be recognized.

In this modified embodiment, the capability notice including the resolution information, which indicates the high resolution (i.e. 600 dpi), is an example of the 'first capability information, which includes the information indicating the specific processing capability.' Further, the capability notice including the resolution information, which does not indicate the high resolution, is an example of the 'second capability information, which does not include the information indicating the specific processing capability.' Further, the rasterization processing for the print data having the high resolution is an example of the 'specific processing'. Further, the print data representing an image including a photograph and the print data representing an image including a text are examples of the 'first condition is satisfied' and the 'second condition is satisfied', respectively.

Modified Embodiment 5

In the above illustrative embodiments, the CPU 22 of the printer PR executes the program 30 in the memory 24, thereby implementing the respective processing of FIGS. 2 to 9. Instead of this, at least one processing of the respective processing may be implemented by hardware such as a logical circuit.

The technical elements described in the specification or drawings exhibit the technical usefulness individually or by a variety of combinations and are not limited to combinations defined in the claims at the time of the filing of the subject application. Further, the technologies described in the specification or drawings accomplish a plurality of purposes at the same time, and accomplishment of one of the plurality of purposes also has the technical usefulness.

What is claimed is:

1. A printer comprising:
 a printing execution unit;
 a processor; and
 a memory storing computer-readable instructions therein, the computer-readable instructions, when executed by the processor, causing the printer to perform:
  supplying first capability information, which includes information indicating that the printer has a specific processing capability, to a first external apparatus,
  acquiring, in response to the supplying of the first capability information to the first external apparatus, first print data from the first external apparatus,
  executing, in response to the acquiring of the first print data, first printing processing that causes the printing execution unit to execute a printing by using the first print data, the first printing processing including specific processing corresponding to the specific processing capability,
  supplying, in a case where the first print data satisfies a first predetermined condition, second capability information, which does not include the information indicating that the printer has the specific processing capability, to a second external apparatus,
  acquiring, in response to the supplying of the second capability information to the second external apparatus, second print data from the second external apparatus, and
  executing, in response to the acquiring of the second print data, second printing processing that causes the printing execution unit to execute a printing by using the second print data, the second printing processing not including the specific processing.

2. The printer according to claim 1,
 wherein the specific processing capability includes a decompression capability with which the printer decompresses data compressed by using a predetermined compression method,
 wherein the first print data is data that is generated by compressing first image data using the predetermined compression method by the first external apparatus,
 wherein the specific processing includes decompression processing of decompressing the first print data,
 wherein the computer-readable instructions, when executed by the processor, causes the printer to further perform:
  determining, in a case where a first compression efficiency when compressing the first image data to the first print data is lower than a first predetermined reference efficiency, that the first print data satisfies the first predetermined condition,
 wherein, in a case where the determining is performed to determine that the first print data satisfies the first predetermined condition, the supplying of the second capability information, which does not include the information indicating that the printer has the specific processing capability, to the second external apparatus is performed, and
 wherein the second print data is data that is obtained without compressing second image data using the predetermined compression format by the second external apparatus.

3. The printer according to claim 2,
wherein the determining determines whether the first compression efficiency is lower than the first reference efficiency by:
  calculating a first index value, which indicates the first compression efficiency, by using a data size of the first print data and a data size of the first image data, and
  comparing the first index value and a reference value indicating the first reference efficiency.

4. The printer according to claim 2,
wherein the determining determines whether the first compression efficiency is lower than the first reference efficiency by:
  calculating a second index value, which indicates the first compression efficiency, by using the first image data, the second index value relating to a number of specific pixels configuring the first image data, and
  comparing the second index value and a reference value indicating the first reference efficiency, and
wherein the specific pixel is a pixel having a pixel value coinciding with a pixel value of an adjacent pixel.

5. The printer according to claim 2,
wherein the computer-readable instructions, when executed by the processor, causes the printer to further perform:
  determining, in a case where a second compression efficiency, which is a compression efficiency when compressing the second print data by using the predetermined compression method, is higher than a second predetermined reference efficiency, that the second print data satisfies a second predetermined condition; and
  supplying, in a case where the determining is performed to determine that the second print data satisfies the second predetermined condition, third capability information, which includes the information indicating that the printer has the specific processing capability, to a third external apparatus.

6. The printer according to claim 1,
wherein the specific processing capability includes a rasterization capability with which the printer rasterizes data having a predetermined data format,
wherein the first print data has the predetermined data format,
wherein the specific processing includes trial processing of trying rasterization of the first print data,
wherein the computer-readable instructions, when executed by the processor, causes the printer to further perform:
  determining, in a case where it is not possible to rasterize the first print data, that the first print data satisfies the first predetermined condition,
wherein, in a case where the determining is performed to determine that the first print data satisfies the first predetermined condition, the supplying of the second capability information, which does not include the information indicating that the printer has the specific processing capability, to the second external apparatus is performed, and
wherein the second print data has a data format different from the predetermined data format.

7. The printer according to claim 6,
wherein the computer-readable instructions, when executed by the processor, causes the printer to further perform:
  supplying third capability information, which includes the information indicating that the printer has the specific processing capability, to a third external apparatus after the executing of the second printing processing is performed.

8. The printer according to claim 6,
wherein the second external apparatus is the same apparatus as the first external apparatus, and
wherein the first print data and the second print data are obtained by using the same image data.

9. The printer according to claim 1,
wherein, in a case where a predetermined request is acquired from the first external apparatus, the supplying of the first capability information, which includes the information indicating that the printer has the specific processing capability, to the first external apparatus is performed,
wherein, in a case where the first print data satisfies the first predetermined condition and the predetermined request is acquired from the second external apparatus which is the same apparatus as the first external apparatus, the supplying of the second capability information, which does not include the information indicating that the printer has the specific processing capability, to the second external apparatus is performed, and
wherein the computer-readable instructions, when executed by the processor, causes the printer to further perform:
  supplying, in a case where the first print data satisfies the first predetermined condition and the predetermined request is acquired from the fourth external apparatus which is a different apparatus from the first external apparatus and the second external apparatus, fourth capability information, which includes the information indicating that the printer has the specific processing capability, to a fourth external apparatus.

10. The printer according to claim 1,
wherein the second capability information does not include the information indicating that the printer has the specific processing capability even if the printer has the specific processing capability.

11. A non-transitory computer-readable storage medium having a computer program stored thereon and readable by a computer of a printer, the computer program, when executed by the computer, causing the printer to perform:
  supplying first capability information, which includes information indicating that the printer has a specific processing capability, to a first external apparatus;
  acquiring, in response to the supplying of the first capability information to the first external apparatus, first print data from the first external apparatus;
  executing, in response to the acquiring of the first print data, first printing processing that causes a printing execution unit of the printer to execute a printing by using the first print data, the first printing processing including specific processing corresponding to the specific processing capability;
  supplying, in a case where the first print data satisfies a first predetermined condition, second capability information, which does not include the information indicating that the printer has the specific processing capability, to a second external apparatus;
  acquiring, in response to the supplying of the second capability information to the second external apparatus, second print data from the second external apparatus, and executing, in response to the acquiring of the second print data, second printing processing that causes the printing execution unit to execute a printing by using the second print data, the second printing processing not including the specific processing.

12. A method for a printer, the method comprising:

supplying first capability information, which includes information indicating that the printer has a specific processing capability, to a first external apparatus;

acquiring, in response to the supplying of the first capability information to the first external apparatus, first print data from the first external apparatus;

executing, in response to the acquiring of the first print data, first printing processing that causes a printing execution unit of the printer to execute a printing by using the first print data, the first printing processing including specific processing corresponding to the specific processing capability;

supplying, in a case where the first print data satisfies a first predetermined condition, second capability information, which does not include the information indicating that the printer has the specific processing capability, to a second external apparatus;

acquiring, in response to the supplying of the second capability information to the second external apparatus, second print data from the second external apparatus, and executing, in response to the acquiring of the second print data, second printing processing that causes the printing execution unit to execute a printing by using the second print data, the second printing processing not including the specific processing.

* * * * *